(12) United States Patent
Gravenites et al.

(10) Patent No.: US 10,216,491 B2
(45) Date of Patent: Feb. 26, 2019

(54) CONTROLLED AVAILABILITY OF OBJECTS IN A VISUAL DESIGN TOOL FOR INTEGRATION DEVELOPMENT

(71) Applicant: Oracle International Corporation, Redwood Shores, CO (US)

(72) Inventors: Greg Gravenites, Littleton, CO (US); Colin Harsh, Centennial, CO (US); Rajan Mahendrakumar Modi, Highlands Ranch, CO (US); Arif Rafique, Parker, CO (US); Vijay Kendai, Aurora, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/706,269

(22) Filed: Sep. 15, 2017

(65) Prior Publication Data
US 2018/0081643 A1   Mar. 22, 2018

Related U.S. Application Data

(60) Provisional application No. 62/396,064, filed on Sep. 16, 2016, provisional application No. 62/510,979, filed on May 25, 2017.

(51) Int. Cl.
*G06F 8/34* (2018.01)
*G06F 8/71* (2018.01)
(Continued)

(52) U.S. Cl.
CPC .......... *G06F 8/34* (2013.01); *G06F 8/24* (2013.01); *G06F 8/65* (2013.01); *G06F 8/71* (2013.01);
(Continued)

(58) Field of Classification Search
None
See application file for complete search history.

(56) References Cited

U.S. PATENT DOCUMENTS

| 6,208,345 | B1 * | 3/2001 | Sheard | G06F 8/34 709/201 |
| 7,174,370 | B1 * | 2/2007 | Saini | G06F 8/36 709/220 |

(Continued)

FOREIGN PATENT DOCUMENTS

| WO | 0221314 | 3/2002 |
| WO | 2006026686 | 3/2006 |

OTHER PUBLICATIONS

Authoring SharePoint Workflows in Visual Studio 2005, Available online at https://msdn.microsoft.com/en-us/library/office/aa830816(v=office.12).aspx#office2007ssintrotoworkflows__authsharepointworkflowsinvs2005, 2005, 3 pages.
(Continued)

*Primary Examiner* — Isaac T Tecklu
(74) *Attorney, Agent, or Firm* — Kilpatrick Townsend & Stockton LLP

(57) ABSTRACT

Techniques are described for controlling availability of objects in a visual design tool for integration development. An integration developer may select a node to add to an integration and, in response, the integration cloud system can analyze the structure of the integration flow, query other nodes within the structure of the integration flow for configuration data, and generate available configuration options for the selected node. The integration cloud system can use the available configuration options to control the availability of objects by only providing the available configuration options for selection by the developer.

20 Claims, 21 Drawing Sheets

(51) Int. Cl.
  *G06F 8/20* (2018.01)
  *G06F 8/65* (2018.01)
  *G06F 17/30* (2006.01)
  *G06F 3/0482* (2013.01)

(52) U.S. Cl.
  CPC .... *G06F 17/30002* (2013.01); *G06F 17/3007* (2013.01); *G06F 17/30091* (2013.01); *G06F 17/30126* (2013.01); *G06F 3/0482* (2013.01)

(56) References Cited

U.S. PATENT DOCUMENTS

| | | | | |
|---|---|---|---|---|
| 7,496,887 | B2* | 2/2009 | Grasselt | G06Q 10/06 717/101 |
| 7,844,911 | B2* | 11/2010 | Austin | G06F 3/0481 709/217 |
| 8,413,115 | B1* | 4/2013 | Surprise | G06F 8/10 709/230 |
| 2004/0044986 | A1* | 3/2004 | Kompalli | G06F 8/20 717/100 |
| 2006/0053408 | A1* | 3/2006 | Kornerup | G06F 8/34 717/109 |
| 2007/0044072 | A1* | 2/2007 | Hayles | G06F 8/34 717/113 |
| 2008/0059436 | A1* | 3/2008 | Crocker | G06F 8/34 |
| 2008/0270977 | A1* | 10/2008 | Nucci | G06F 8/10 717/105 |
| 2009/0132506 | A1* | 5/2009 | Houck | G06F 17/30976 |
| 2010/0011309 | A1* | 1/2010 | Mitra | G06T 11/20 715/768 |
| 2011/0161920 | A1* | 6/2011 | Alexander | G06F 8/34 717/105 |
| 2011/0191753 | A1* | 8/2011 | Ghercioiu | G06F 8/61 717/132 |
| 2011/0246961 | A1* | 10/2011 | Tripathi | G06F 8/34 717/105 |
| 2013/0093771 | A1* | 4/2013 | Simitsis | G06T 11/206 345/440 |
| 2013/0290980 | A1* | 10/2013 | Kemp | G06F 13/00 719/312 |
| 2014/0240754 | A1* | 8/2014 | Smyth | G06F 3/1204 358/1.15 |
| 2014/0282364 | A1* | 9/2014 | Woodward | G06F 8/34 717/105 |
| 2016/0182652 | A1* | 6/2016 | Bevilacqua | G06F 9/546 709/203 |
| 2016/0359689 | A1* | 12/2016 | Herreria | G06F 3/04847 |
| 2016/0378274 | A1* | 12/2016 | Akiner | G06F 3/0482 715/760 |
| 2018/0081739 | A1* | 3/2018 | Gravenites | H04L 41/50 |
| 2018/0081895 | A1* | 3/2018 | Kendai | G06F 17/30002 |

OTHER PUBLICATIONS

Building a Workflow—Drip Knowledge Base, Available online at http://kb.getdrip.com/email-automation/workflows/building-a-workflow/, accessed from internet on May 10, 2017, 10 pages.

Hybrid Integration Platform for Cloud, SaaS & IoT, Available online at https://www.robomq.io/index.html#microservices, 2017 17 pages.

Integration Flow Designer, Available online at https://www.robomq.io/products/flow.html, 2017, all pages.

SAP Cloud Platform Integration, Available online at https://cloudplatform.sap.com/capabilities/integration/cloud-integration.html#, accessed from internet on May 9, 2017, 6 pages.

Simple Marketing Automation Workflows by Drip, Available online at https://www.drip.co/workflows, 2017, 6 pages.

Danila et al., Change Impact Analysis in WS-BPEL Processes, U.P.B. Sci. Bull., Series C, vol. 77, Iss. 2, 2015, pp. 123-136.

Wang et al., Change Impact Analysis in Service-Based Business Processes, Service Oriented Computing and Applications, vol. 6, 2012, pp. 131-149.

* cited by examiner

CONTROLLED AVAILABILITY OF OBJECTS IN A VISUAL DESIGN TOOL FOR INTEGRATION DEVELOPMENT

CROSS-REFERENCES TO RELATED APPLICATIONS

This application claims priority to U.S. Provisional Application No. 62/396,064 filed on Sep. 16, 2016 in the United States Patent and Trademark Office, entitled "CLOUD SERVICE ORCHESTRATION" and U.S. Provisional Patent Application No. 62/510,979 filed on May 25, 2017 in the United States Patent and Trademark Office, entitled "INTEGRATION CLOUD SERVICE," the disclosures of which are incorporated by reference herein in their entirety.

BACKGROUND

A user may have one or more applications that they would like to integrate. Data or functions from a first application may be combined with data or functions of a second application. For example, the user of a marketing application may desire to use information from a human resources application. In another example, a new sales application may want to incorporate data from an old sales application. Instead of transferring or copying all of the data from the first application to the second application, the applications can be integrated. This would allow the second application to access and use data or functions from the first application more easily.

The integration can be done through the creation of an integration flow. An integration flow can define, for example, the collection of data from a first system, activities performed on the data (e.g., formatting of the data to be compatible with the second system), and distribution of the data to the second system. However, during development of the integration flow, a developer may not be aware of available data or information at runtime. For that reason, integration flows can fail during execution or provide incorrect data or incorrectly formatted data. Such failures and errors can be difficult to troubleshoot. Accordingly, new and improved methods and systems are needed.

BRIEF SUMMARY

Applications may be integrated or combined so that, for example, data between applications can be shared. Different types of applications, including on-premise and cloud applications, may be integrated by an integration system such as integration cloud service system. The applications may be in a cloud environment or may be on-premise at a location of the application provider. By integrating a plurality of different applications, a user can perform desired functions more quickly and efficiently.

In order to integrate data from a first application to a second application, an integration flow can be created. An integration flow can also be called an integration, a flow, or an orchestration. In order to integrate applications, an integration flow can be created that specifies how data in the first application is to be integrated or combined with the second application so that the data can be used by the second application. Applications that are integrated can include human resources applications, accounting applications, social media applications, etc. Any type of applications that a user desires to combine can be integrated in an integration flow.

An integration flow can be created which identifies one or more data sources and actions to be performed on the data. Specifically, an integration flow can include a source application, one or more actions, and one or more target applications. A source application, target application, and actions can be called activities. A source application and a target application are application activities and actions are action activities. Each of the activities can be represented as nodes or elements in an integration flow.

The source application can also be known as the trigger, trigger application, source activity, or trigger activity. The target application of the data can also be known as the destination application, invoke, invoke application, target activity or invoke activity. The actions can identify, for example, actions that are to be applied to particular data from the source application so that the data can be integrated with the target application. Through an integration flow, data from a first application can be made to be compatible with a second application. Therefore, the second application can use data from the first application.

An integration system, in accordance with example embodiments, simplifies the creation of an integration flow. A user with minimal technical knowledge can build up a very complex integration flow in order to integrate applications.

An integration cloud service system can include bilateral connections with one or more applications. The applications can offer different services. For example, the integration system can connect two or more applications. The applications can correspond to different types of systems. One or more applications could be stored on a cloud system and one or more applications can be stored in an on-premise system. An on-premise system can be located locally in, for example, a building. Therefore, a bilateral connection connects one endpoint, such as a source application, to a second endpoint, such as a target application.

The source application and the destination application can correspond to a same type of system or to a different type of system. For example, a business system application can be integrated with a resource planning system application, an FTP server can be connected with a data file representing different records, or different social media application systems can be connected.

According to embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that can include receiving, via a visual development tool interface, selection of a first node to configure in an integration flow. The method can also include identifying a structure of the integration flow and generating, based on the structure of the integration flow and a location of the first node in the integration flow, a list including an identifier for each other node in the structure of the integration flow. The method can also include, for each other node in the list, querying the node for node configuration data. The method can also include adding the node configuration data to a structure configuration data and generating available configuration options for the first node based on the structure configuration data. The method can also include updating the visual development tool interface with the available configuration options for the first node. Other embodiments of this aspect include corresponding computer systems, apparatus, and computer programs recorded on one or more computer storage devices, each configured to perform the actions of the methods.

Implementations may include one or more of the following features. Optionally, the method can include where updating the visual development tool interface with the available configuration options for the first node includes displaying, in the visual development tool interface, a selectable list of available options for a first configuration option of the first node. Optionally, the method can include where the displaying the selectable list of available options includes displaying, in the visual development tool interface, a selectable list of available input options to configure an input of the first node. Optionally, the method can include where the generating the list further includes identifying a set of nodes that precede the location of the first node in the integration flow based on the structure of the integration flow and the location of the first node in the integration flow. The method may also include where querying the node for node configuration data includes, for each node in the set of nodes that precede the first node in the integration flow, querying the node for data introduced into the integration flow by the node. The method may also include where the selectable list of available input options is generated based on the data introduced into the integration flow by nodes preceding the first node in the integration flow.

Optionally, the method can also include where displaying a selectable list of available options includes displaying, in the visual development tool interface, a selectable list of available output options to configure an output of the first node. Optionally, the method can include where the generating the list further includes identifying a set of nodes following the location of the first node in the integration flow based on the structure of the integration flow and the location of the first node in the integration flow. The method may also include where the selectable list of available output options is generated based on the set of nodes following the first node in the integration flow.

Optionally, the method can include receiving the location of the first node as an insertion point for the first node, adding the first node to the integration flow at the insertion point, and displaying, in the visual development tool interface, an indicator that a second node has additional available configuration options as a result of adding the first node to the integration flow. Implementations of the described techniques may include hardware, a method or process, or computer software on a computer-accessible medium.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

In the following description, for the purposes of explanation, specific details are set forth in order to provide a thorough understanding of example embodiments. However, it will be apparent that various embodiments may be practiced without these specific details. For example, systems, algorithms, structures, techniques, networks, processes, and other components may be shown as components in block diagram form in order not to obscure the embodiments in unnecessary detail. The figures and description are not intended to be restrictive.

A user can create an integration flow through an integration system. The user can include, for example, a creator of the integration flow, such as an integration developer. The user can also include, for example, an end user, such as a customer who desires to use the data provided by the integration flow. An integration system can also be called an integration cloud service system.

Figure 1:
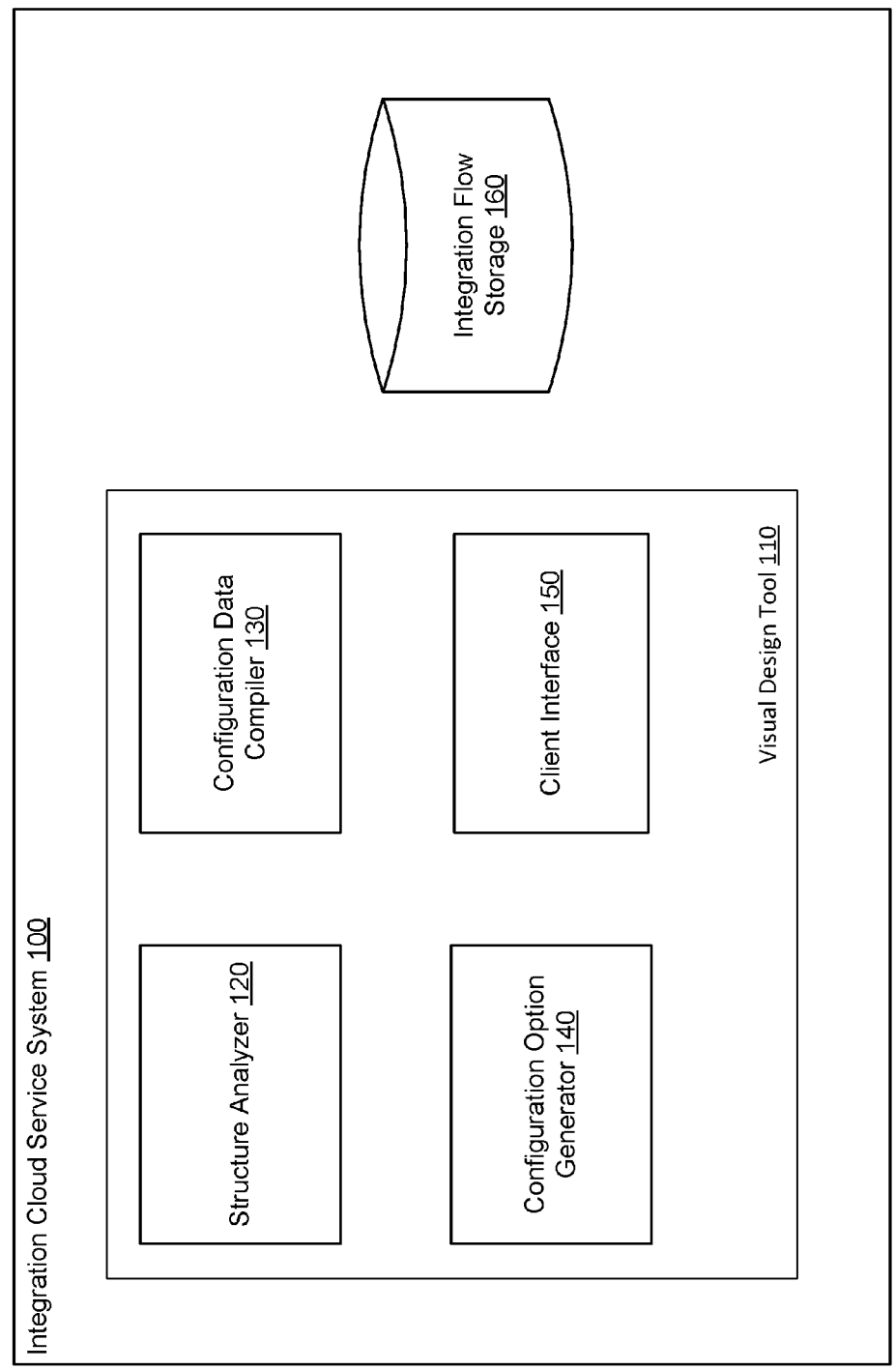
FIG. 1 illustrates an integration cloud service system, in accordance with some example embodiments.

FIG. 1 illustrates an integration cloud service system 100, in accordance with some example embodiments. Through the integration cloud service system, the user can connect two or more applications together by creating an integration flow.

An integration flow can be created through a design tool. For example, a visual design tool (also referred to herein as a visual development tool) can be provided by the integration cloud service system 100 to allow a user to design (i.e., develop) an integration flow without deep knowledge of a software development language.

An integration flow can include a source application and a target application, as well as activities that are applied to connect the source application to the target application. The source application, target application and one or more actions can be called nodes or elements of the integration flow. Further, the source application and target application can be application activities of the integration flow and the actions can be action activities of the integration flow. When the integration flow is valid and applied, data from the source application can be compatible with the destination application.

The visual design tool can provide a visual interface for selection of the source application, target application, and activities (i.e., the nodes) needed to develop the integration flow. The visual design tool can further provide a visual, intuitive, interface for configuring each node.

Action activities can include, for example, assign, callback, fault return, for each, function call, logger, map, notification, raise error, return, scope, stage file, switch, stop, wait, and while. Action activities are actions that can be applied to data in an integration flow.

In an example integration flow, information from a human resources system can be connected with information in a marketing system. Employee information from the human resources system can be used by the marketing system in order to send marketing information to the employees. The human resources system can be the source application and the marketing system can be the target application. Activities can be applied to information (e.g., records) from the human resources system so that the information from the human resources system is compatible with the marketing system.

Through an integration cloud service system 100, a user can collect data regarding activities that are happening in the integration flow and can provide information to a user regarding the status of the integration flow. During development of the integration flow, the integration cloud service system 100 can provide the visual design tool used for the integration flow development.

For example, the user may develop an integration flow to change employee information in a source application that can affect the target application. An example embodiment can provide a visual design tool that controls the objects available to the user during the development of the integration flow. For example, the user can select the source application to collect the employee information. Configuration options of another node selected for adding or configuring in the integration flow can be limited at design time, for example, to manipulating employee data collected from the source application.

The integration cloud service system 100 can include a visual design tool 110 and integration flow storage 160. The integration cloud service system 100 can include many other features and modules not depicted in FIG. 1 for simplicity of the description herein. For example, the integration cloud service system 100 can include features for execution of the developed integration flows and databases for storage of other data used by the integration cloud service system 100 for other additional features.

The integration cloud service system 100 can be any suitable computer system for storing and performing the controlled availability of objects in a visual design tool for integration development as described herein. For example, the integration cloud service system 100 can be computer system 2100 of FIG. 21, included in a cloud system as described with respect to FIG. 20, and/or included in a distributed system as described with respect to FIG. 19.

The integration flow storage 160 can be, for example, any suitable database for storing the integration flows developed by the visual design tool 110. For example, integration flow storage 160 can be database 1914 or 1916 described with respect to FIG. 19 and/or database 2018 as described with respect to FIG. 20. The visual design tool 110 can save integration flows into integration flow storage 160.

The visual design tool 110 can be comprised of instructions stored on a memory (e.g., system memory 2110 of FIG. 21) in the integration cloud service system 100. The visual design tool can provide the visual design interface to the client for development of the integration flow. The visual design tool 110 can include a structure analyzer 120, a configuration data compiler 130, a configuration option generator 140, and a client interface 150. While the features of visual design tool 110 are described and depicted as performed in specific modules including the structure analyzer 120, the configuration data compiler 130, the configuration option generator 140, and the client interface 150, for ease of description, each of the functions can be performed in more or fewer modules and are not limited to the specific configuration described. The visual design tool can also include many other modules and features not depicted in FIG. 1 for simplicity of the description herein. For example, the visual design tool can include modules or instructions for any number of features offered in a visual design interface including logic for graphics rendering, saving integration flows, obtaining information from storage regarding applications for integration, and so forth.

The structure analyzer 120 can, during development of an integration flow, analyze the structure of the current integration flow. For example, an integration flow at any point during development can include a number of nodes, a position of each node in the flow, and each node can be of a certain type. The structure analyzer 120 can analyze the structure of the current integration flow and generate, for example, a list of nodes upstream (i.e., preceding) a location of a selected node in the integration flow or of a selected insertion point if the node is being added to the integration flow. As another example, the structure analyzer 120 can analyze the structure of the current integration flow and generate a list of nodes downstream (i.e., following) the location of the selected node in the integration flow or of the selected insertion point if the node is being added to the integration flow. For the remainder of the description of FIG. 1, the term first node will be used to describe the node to be configured or added.

The structure analyzer 120 can analyze the structure of the integration flow by reviewing the integration flow that is currently displayed in the visual design tool interface to the user. For example, the structure analyzer 120 can obtain the data regarding the integration flow from integration flow storage 160. As another example, the structure analyzer 120 can obtain the data regarding the integration flow that is currently displayed from the memory space (e.g., RAM) in which the display is generated. Based on the obtained data, the structure analyzer can generate a list of the nodes. The identification of each node can be, for example, a memory pointer to the node's location in the memory space. The structure analyzer can generate a list of the nodes that indicates the node's identifier as well as the node's location in the flow relative to the other nodes. The structure analyzer 120 can be invoked, for example, when a user attempts to insert a node into an integration flow. The structure analyzer 120 can be provided with the type of node that is being added (e.g., a map node, a return node, and so forth) and an insertion point for the node. For example, the structure analyzer can be called as a function call with the insertion point and type of node as parameters passed into the function call. As another example, the structure analyzer 120 can be invoked when a user attempts to configure a node in an integration flow. The structure analyzer 120 can be provided with the node identifier (e.g., a memory pointer to the node's location in memory). The structure analyzer 120 can generate the list of nodes and indicate which node within the list is the selected node for configuration, for example. Once the structure analyzer 120 generates the list, the structure analyzer 120 can pass the list to the configuration data compiler 130.

The configuration data compiler 130 can, during development of an integration flow, interrogate (i.e., query) each node in the current integration flow for configuration data. For example, the configuration data compiler 130 can identify the type of node and other configuration data from each node, which is otherwise only known by the node. The configuration information for each node can be optionally stored with the node in the memory space from which the structure analyzer 120 obtained the structure information. Optionally, the configuration information can be stored in a different memory space which can be obtained with other information stored with the structure information. For example, the node can include a pointer to a different memory space containing the configuration data for that node.

The configuration data compiler 130 can obtain the list from the structure analyzer 120. For example, the configuration data compiler 130 can be invoked as a function call with the list passed as a parameter into the function call. The list can be, for example, passed using a memory pointer as a parameter of the function call. The configuration data compiler 130 can use the list to query each node in the list to obtain configuration data for each node. For example, the configuration data compiler 130 can access the memory space for each node and obtain relevant information for that node. For example, the list can specify each node that precedes the location of the first node (i.e., the node to be configured) in the integration flow (or the insertion point in the integration flow if the first node is to be added) and/or each node that follows the first node (or the insertion point) in the integration flow. The configuration data compiler 130 can cycle through the list and query each node that precedes the first node (or insertion point) to identify the type of node (e.g., map node, decision node, and so forth) and, for example, whether the node introduces data into the integration flow. The configuration data compiler 130 can, as another example, cycle through the list and query each node that follows the first node (or insertion point) to identify the type of node and, for example, the node's currently configured input, if any.

Optionally, the configuration data compiler 130 can query each node by reading the memory space for the node to find the configuration data. Optionally, the configuration data compiler 130 can store a list of nodes that precede the first node (or insertion point) that introduce data into the integration flow in a structure configuration data. Optionally, the configuration data compiler 130 can generate a list of the data types that are introduced into the integration flow prior to the first node (or insertion point) and include the list in the structure configuration data. Optionally, the configuration data compiler 130 can store a list of nodes that follow the first node (or insertion point) that can receive input from one or more sources and include the list in the structure configuration data. The structure configuration data generated by the configuration data compiler 130 can be passed to the configuration option generator 140.

The configuration option generator 140 can, during development of an integration flow, limit the configuration options for the first node based on the structure configuration data generated by the configuration data compiler 130. The structure configuration data can be provided to the configuration option generator 140. For example, the configuration option generator 140 can be invoked as a function call and the structure configuration data can be passed, or a memory pointer to the data can be passed, as a parameter to the function call. Optionally, the structure configuration data can always be stored in the same location, which the configuration option generator 140 knows. The configuration option generator 140 can then use the known location of the structure configuration data to generate the configuration options for the first node. The configuration option generator 140 can also receive or obtain the type of the first node. Based on the type of the first node, the configuration option generator 140 can determine what configuration parameters exist for the first node. For example, the first node may have configuration parameters for an input and/or an output. The configuration option generator can then generate available configuration options for each configuration parameter for the first node. For example, the configuration option generator 140 can generate a selectable list of input options that are available to the first node. The configuration option generator 140 can provide the available configuration options to the client interface 150 for display in the visual design tool interface to the user.

Optionally, the configuration option generator 140 can maintain the available configuration options for each node by, for example, storing the available configuration options in memory (e.g., RAM) for later use by the visual design tool without having to regenerate the list of available options each time the user selects a node to configure. Optionally, the visual design tool 110 can invoke the structure analyzer 120 each time a configuration parameter for any node in the integration flow is changed to ensure the available configuration options for each node is updated. Optionally, to maintain the available configuration options, the structure analyzer 120 can analyze the structure with respect to each node, the configuration data compiler can obtain configuration information relevant to each node, and the configuration option generator can generate the available configuration options for each node and store the information in memory. When a node is added, deleted, or changed, the structure analyzer 120 can be invoked and the process can run again to update the available configuration options for each node. Optionally, if an available configuration option changes for a node, the visual design tool interface can display a notification or indicator that the available configuration options for the node have changed.

As described above, the visual design tool can, in this way, control the availability of objects in the visual design tool interface for integration development. Specifically, the user can be limited to selection of specific objects for configuration parameters.

Figure 2:
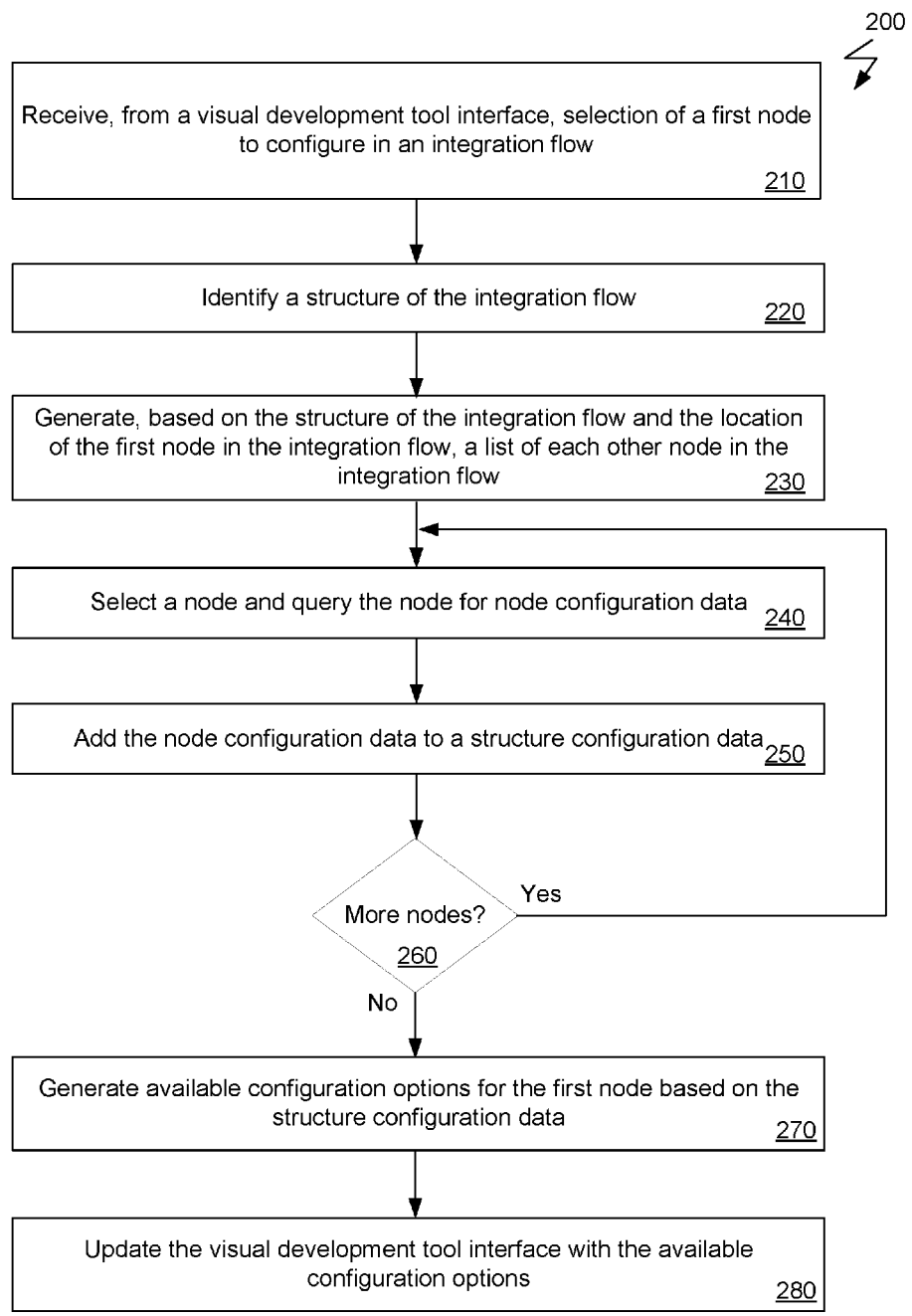
FIG. 2 illustrates a flow diagram of controlled availability of objects in a visual design tool for integration development, in accordance with some example embodiments.

FIG. 2 illustrates a flow diagram 200 of controlled availability of objects in a visual design tool for integration development. The flow diagram 200 can be a method performed by, for example, visual design tool 110 of FIG. 1 executing on a computer system, such as computer system

Figure 21:
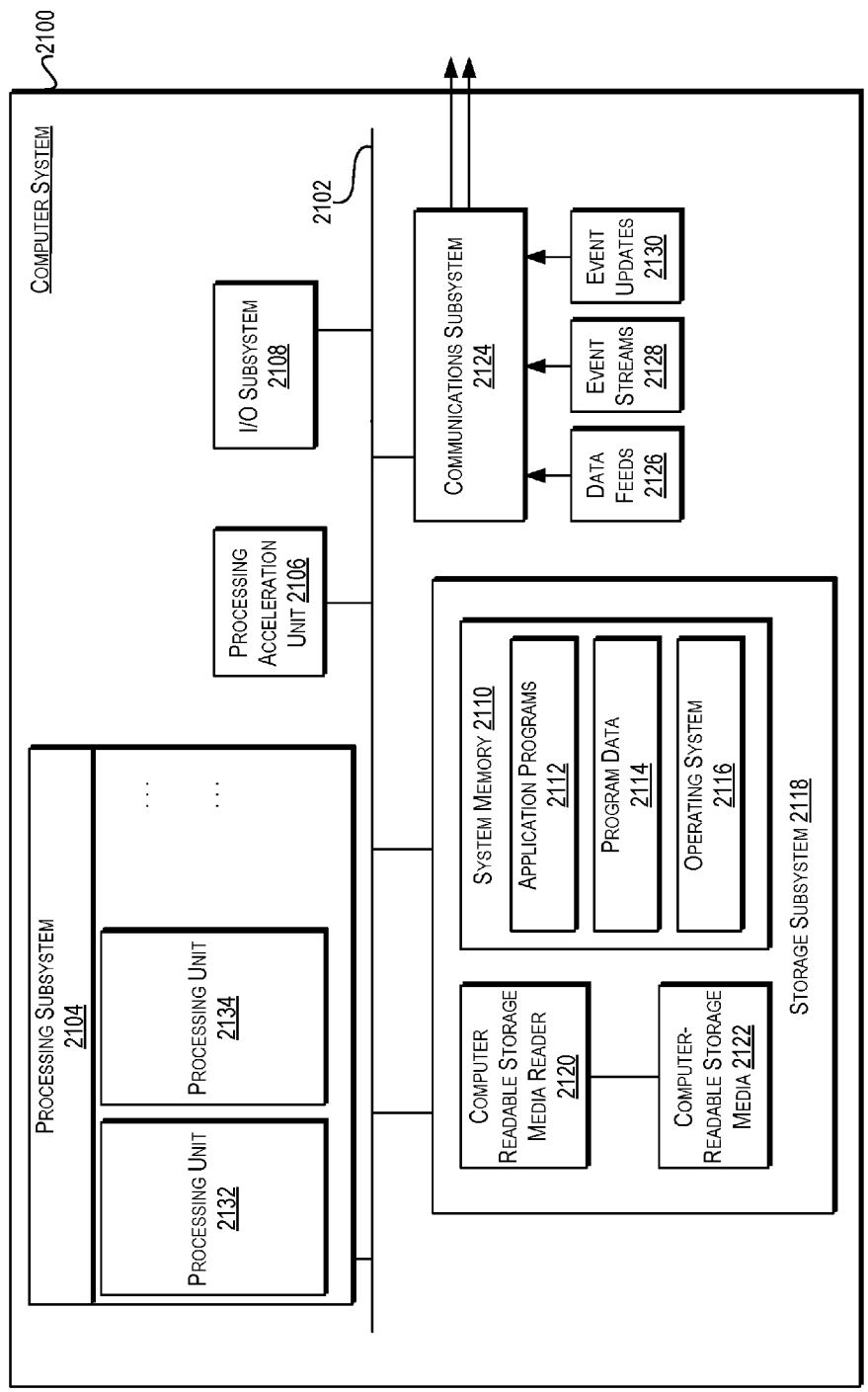
FIG. 21 illustrates a computer system that may be used to implement some of the example embodiments.

2100 of FIG. 21. Flow diagram 200 can begin at 210 with the computer system receiving, from a visual development tool interface, selection of a first node to configure in an integration flow. For example, a user can drag and drop a node (e.g., an activity, a source application, a destination application, and so forth) for insertion into an integration flow using a visual interface that allows the node to be dropped at a location within the integration flow that is being developed. As another example, a user can select a node already in the integration flow to edit the configuration parameter values.

At 220, the computer system can identify a structure of the integration flow. The structure can be identified by, for example, a module or function such as structure analyzer 120 of FIG. 1. The structure can by identified by locating each node in the integration flow and each node's location in the integration flow with respect to the location of the first node (i.e., the node to be configured) or with respect to an insertion point of the first node if the first node is to be added.

At 230, the computer system can generate, based on the structure of the integration flow and the location (or insertion point) of the first node, a list of each other node in the integration flow. The list can be generated by, for example, a module or function such as structure analyzer 120 of FIG. 1. The list can be generated by including an identifier for each node in the integration flow. The identifier can be, for example, a memory pointer to the location in a memory space at which the node is stored for the integration flow. The location in memory can include, for example, other configuration data about the node or a memory pointer to another location in the memory space where configuration information about the node is stored. The list can include the identifier for each node along with information about where the node is located in the integration flow with respect to the location (or insertion point) of the first node. For example, the list can include a parameter for each node that specifies whether the node precedes the location (or insertion point) of the first node or follows the location (or insertion point) of the first node. Optionally, the list can include a parameter that lists the node's location based on the node's position in the integration flow. For example, the first node to execute (i.e., the trigger node) can have a location parameter of "1," the second node to execute can have a location parameter of "2," and so forth.

At 240, the computer system can select a node from the list and query the node for node configuration data. The querying can be performed by, for example, configuration data compiler 130 of FIG. 1. For example, the computer system can, using the list, select the first node, find the node information based on the identifier, and obtain the associated configuration data for the node. As discussed with respect to FIG. 1, this querying can be done using memory pointers to obtain the configuration data. Optionally, a database query can be performed to obtain the configuration data for the node.

At 250, the computer system can add the node configuration data to a structure configuration data for the first node. The adding can be performed by, for example, configuration data compiler 130 of FIG. 1. Stated differently, a structure configuration data generated with respect to the location (or insertion point) of the first node can be updated with the node configuration data obtained through the query performed at 240. The structure configuration data can include, for example, for each node: data identifying the node, the node's location in the integration flow, whether the node introduces data into the flow, the type of node, and so forth.

At 260, the computer system can determine whether there are any more nodes in the list. The determination can be performed by, for example, configuration data compiler 130 of FIG. 1. For example, the computer system can cycle through the list from top to bottom and determine there are no more nodes in the list when the end of the list is reached. If there are additional nodes in the list, the computer system can return to 240 and select another node from the list (e.g., the next node in the list). If there are no additional nodes in the list (e.g., because the end of the list has been reached), the computer system can proceed to 270.

At 270, the computer system can generate available configuration options for the first node based on the structure configuration data. The generation of the available configuration options can be performed by, for example, configuration option generator 140 of FIG. 1. For example, based on the type of node the first node is, the computer system can determine whether an input, an output, or any other configuration parameters are needed. Based on the configuration parameters for the first node, the computer system can determine available options for the configuration parameter. The available options can be used to generate, for example, a selectable list of available options for the configuration parameter.

At 280, the computer system can update the visual development tool interface with the available configuration options. The update can be performed by, for example, client interface 150 of FIG. 1. The computer system can provide the available options for the configuration parameter to the user through the visual design tool interface. For example, the available options can be displayed when the user is configuring the node. Optionally, the available options can be displayed as a selectable list of available options for the configuration parameter. By only displaying the available options for configuration, the system controls the availability of objects to select for configuration of the activities within integration flow.

Figure 3:
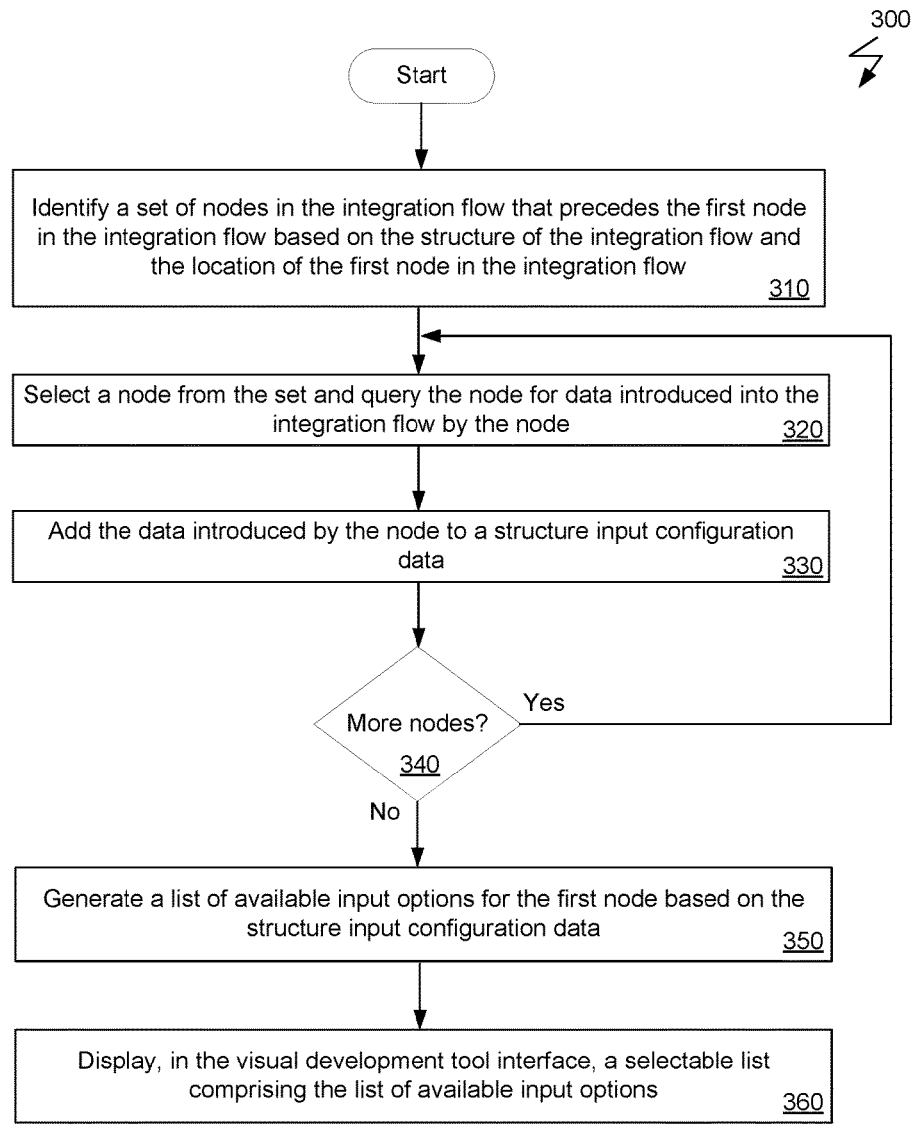
FIG. 3 illustrates a flow diagram of controlled availability of upstream objects in a visual design tool for integration development, in accordance with some example embodiments.

FIG. 3 illustrates a flow diagram 300 of controlled availability of objects in a visual design tool for integration development. More specifically, the flow diagram 300 provides a method of controlling the availability of objects for selection as a configuration parameter for an input to a node selected for configuration. The flow diagram 300 can be a method performed by, for example, visual design tool 110 of FIG. 1 executing on a computer system, such as computer system 2100 of FIG. 21. Flow diagram 300 can be an optional portion of the flow diagram 200 of FIG. 2. For example, flow diagram 300 can be executed after the structure of the integration flow has been identified.

Flow diagram 300 can begin at 310 with the computer system identifying, based on the structure of the integration flow and the location (or insertion point) of the first node in the integration flow, a set of nodes that precede the location (or insertion point) of the first node in the integration flow. Optionally, the computer system can generate a list of the identified nodes. The nodes can be identified by, for example, a module or function such as structure analyzer 120 of FIG. 1. The nodes can be identified by, for example, a memory pointer to the location in a memory space at which the node is stored for the integration flow. The location in memory can include, for example, other configuration data about the node or a memory pointer to another location in the memory space where configuration information about the node is stored. Optionally, the list can be generated and include the identifier for each node along with information about where the node is located in the integration flow with respect to the location (or insertion point) of the first node.

For example, the list can include a parameter for each node that specifies that the node precedes the location (or insertion point) of the first node. Optionally, the list can include a parameter that lists the node's location based on the node's position in the integration flow. For example, the first node to execute (i.e., the trigger node) can have a location parameter of "1," the second node to execute can have a location parameter of "2," and so forth. Optionally, identifying a set of nodes can include eliminating nodes that are within a scope (e.g., router, for loop, while loop, and so forth).

At 320, the computer system can select a node from the set of nodes and query the node to determine whether the node introduces data into the integration flow at runtime. The querying can be performed by, for example, configuration data compiler 130 of FIG. 1. For example, the computer system can, using the list, select the first node, find the node information based on the identifier, and obtain the associated configuration data for the node, including the type of the node and whether the node introduces data into the integration flow at runtime. As discussed with respect to FIG. 1, this querying can be done using memory pointers to obtain the configuration data. Optionally, a database query can be performed to obtain the configuration data for the node.

At 330, the computer system can add information about data introduced by the node into the integration flow at runtime to a structure input configuration data for the first node. The adding can be performed by, for example, configuration data compiler 130 of FIG. 1. Stated differently, a structure input configuration data generated with respect to the location of the first node can be updated with the data introduced into the integration flow at runtime by the node. The structure input configuration data can include, for example, for each node: data identifying the node, the node's location in the integration flow, a pointer to a data object representing the data introduced into the integration flow at runtime by the node, and so forth. If the node does not introduce data into the integration flow at runtime, the node can optionally be left out of the structure input configuration data. In some cases, the location of a node in the integration flow can affect the ability of the node to provide input to the first node. For example, an integration flow, such as integration flow 500 of FIG. 5, having a decision block that is determined at runtime can affect a node's ability to be the input for the first node. Because a decision block is determined at runtime, the output of a node within a branch of the integration flow may, in some cases, not be configured to be the input of the first node.

At 340, the computer system can determine whether there are any more nodes in the set. The determination can be performed by, for example, configuration data compiler 130 of FIG. 1. For example, the computer system can cycle through the set from beginning to end and determine there are no more nodes in the list when the end of the set is reached. If there are additional nodes in the set, the computer system can return to 320 and select another node from the set (e.g., the next node in the set). If there are no additional nodes in the set (e.g., because the end of the set has been reached), the computer system can proceed to 350.

At 350, which can correspond with or replace 270 of FIG. 2, the computer system can generate available input configuration options for the first node based on the structure input configuration data. The generation of the available input configuration options can be performed by, for example, configuration option generator 140 of FIG. 1. For example, the computer system can cycle through the structure input configuration data and extract the data objects corresponding to the data introduced into the integration flow. Optionally, the computer system can generate a selectable list of available input options for the input configuration parameter of the first node.

At 360, which can correspond with or replace 280 of FIG. 2, the computer system can update the visual development tool interface with the available input configuration options for the first node. The update can be performed by, for example, client interface 150 of FIG. 1. The computer system can provide the available input options for the input configuration parameter for the first node to the user through the visual design tool interface. For example, the available options can be displayed when the user is configuring the node. Optionally, the available input options can be displayed as a selectable list of available input options for configuration of the input configuration parameter of the first node. By only displaying the available input options during configuration, the system controls the availability of objects to select for configuration of the activities within the integration flow.

Figure 4:
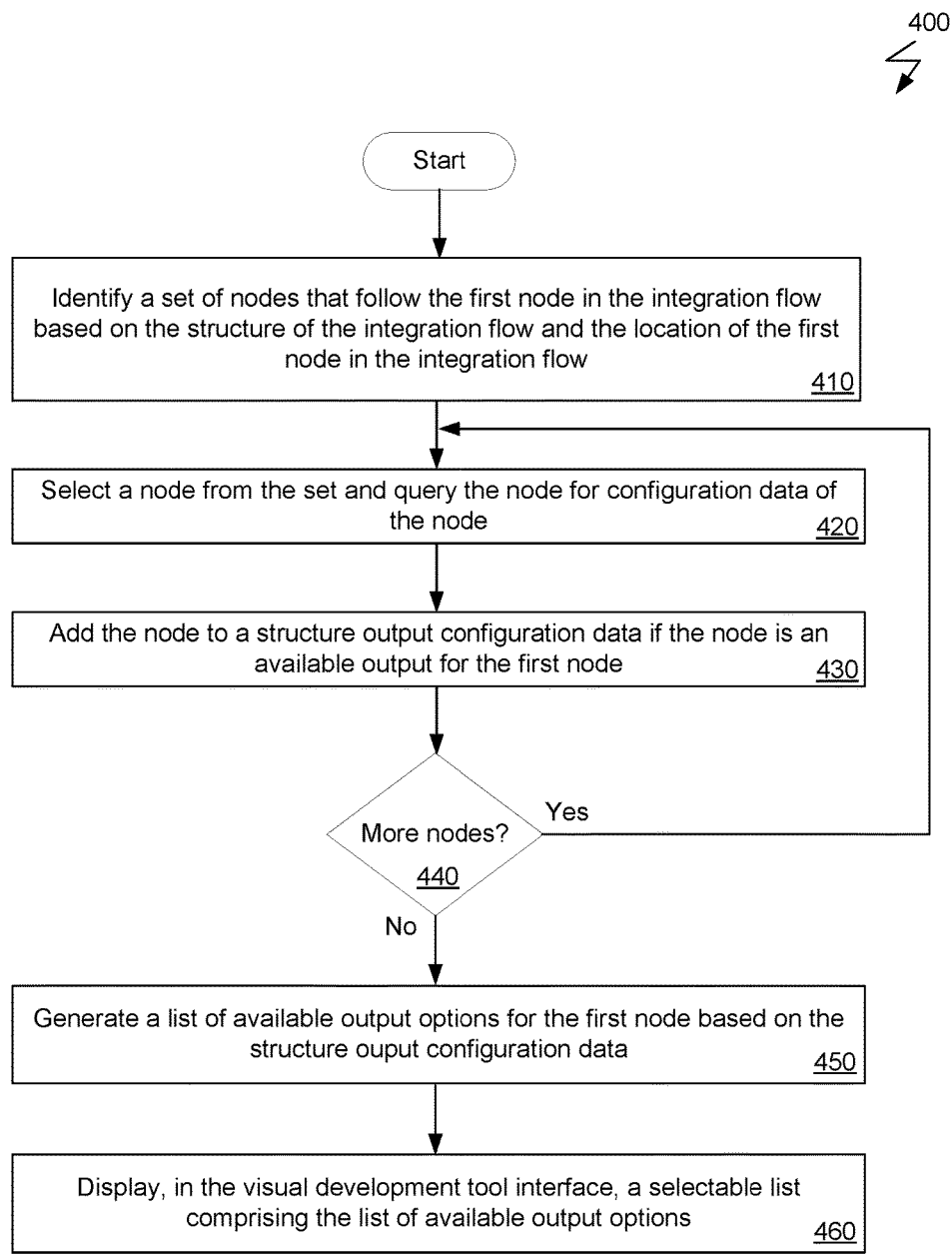
FIG. 4 illustrates a flow diagram of controlled availability of downstream objects in a visual design tool for integration development, in accordance with some example embodiments.

FIG. 4 illustrates a flow diagram 400 of controlled availability of objects in a visual design tool for integration development. More specifically, the flow diagram 400 provides a method of controlling the availability of objects for selection as a configuration parameter for an output of a node selected for configuration. The flow diagram 400 can be a method performed by, for example, visual design tool 110 of FIG. 1 executing on a computer system, such as computer system 2100 of FIG. 21. Flow diagram 400 can be an optional portion of the flow diagram 200 of FIG. 2. For example, flow diagram 400 can be executed after the structure of the integration flow has been identified.

Flow diagram 400 can begin at 410 with the computer system identifying, based on the structure of the integration flow and the location (or insertion point) of the first node in the integration flow, a set of nodes that follow the location (or insertion point) of the first node in the integration flow. Because the available output options for the first node can be based on nodes that precede the first node in the integration flow, the set of nodes can optionally include all the nodes in the integration flow. Optionally, the computer system can generate a list of the identified nodes. The nodes can be identified by, for example, a module or function such as structure analyzer 120 of FIG. 1. The nodes can be identified by, for example, a memory pointer to the location in a memory space at which the node is stored for the integration flow. The location in memory can include, for example, other configuration data about the node or a memory pointer to another location in the memory space where configuration information about the node is stored. Optionally, the list can be generated and include the identifier for each node along with information about where the node is located in the integration flow with respect to the location (or insertion point) of the first node. For example, the list can include a parameter for each node that specifies that the node follows the location (or insertion point) of the first node. Optionally, the list can include a parameter that lists the node's location based on the node's position in the integration flow. For example, the first node to execute (i.e., the trigger node) can have a location parameter of "1," the second node to execute can have a location parameter of "2," and so forth. Optionally, identifying a set of nodes can include eliminating nodes that are within a scope (e.g., router, for loop, while loop, and so forth).

At 420, the computer system can select a node from the set of nodes and query the node for configuration data, such as for example, to determine whether the node can receive an input from the first node's output at runtime. The querying can be performed by, for example, configuration data compiler 130 of FIG. 1. For example, the computer system can, using the set, select the first node in the set, find the node information based on the identifier, and obtain the associated configuration data for the node, including the type of the node and whether the node can receive an input from the first node at runtime. For example, an integration flow, such as integration flow 500 of FIG. 5, having a decision block that is determined at runtime can affect a node's ability to be the output for the first node. Because a decision block is determined at runtime, the output of a node may, in some cases, not be configured to a node appearing within a branch of the integration flow. As discussed with respect to FIG. 1, this querying can be done using memory pointers to obtain the configuration data. Optionally, a database query can be performed to obtain the configuration data for the node.

At 430, the computer system can add information about the node's ability to receive input at runtime to a structure output configuration data for the first node. The adding can be performed by, for example, configuration data compiler 130 of FIG. 1. Stated differently, a structure output configuration data generated with respect to the location of the first node can be updated with the information about the node's ability to receive input at runtime. The structure output configuration data can include, for example, for each node: data identifying the node, the node's location in the integration flow, an indication of whether the node can be used as an output for the first node, and so forth. If the node cannot be used as an output for the first node at runtime, the node can optionally be left out of the structure output configuration data.

At 440, the computer system can determine whether there are any more nodes in the set. The determination can be performed by, for example, configuration data compiler 130 of FIG. 1. For example, the computer system can cycle through the set from beginning to end and determine there are no more nodes in the list when the end of the set is reached. If there are additional nodes in the set, the computer system can return to 420 and select another node from the set (e.g., the next node in the set). If there are no additional nodes in the set (e.g., because the end of the set has been reached), the computer system can proceed to 450.

At 450, which can correspond with or replace 270 of FIG. 2, the computer system can generate available output configuration options for the first node based on the structure output configuration data. The generation of the available output configuration options can be performed by, for example, configuration option generator 140 of FIG. 1. For example, the computer system can cycle through the structure output configuration data and extract the data objects corresponding to the nodes that can be used as an output for the first node at runtime. Optionally, the computer system can generate a selectable list of available output options for the output configuration parameter of the first node.

At 460, which can correspond with or replace 280 of FIG. 2, the computer system can update the visual development tool interface with the available output configuration options for the first node. The update can be performed by, for example, client interface 150 of FIG. 1. The computer system can provide the available output options for the output configuration parameter for the first node to the user through the visual design tool interface. For example, the available options can be displayed when the user is configuring the node. Optionally, the available output options can be displayed as a selectable list of available output options for configuration of the output configuration parameter of the first node. By only displaying the available output options during configuration, the system controls the availability of objects to select for configuration of the activities within the integration flow.

Figure 5:
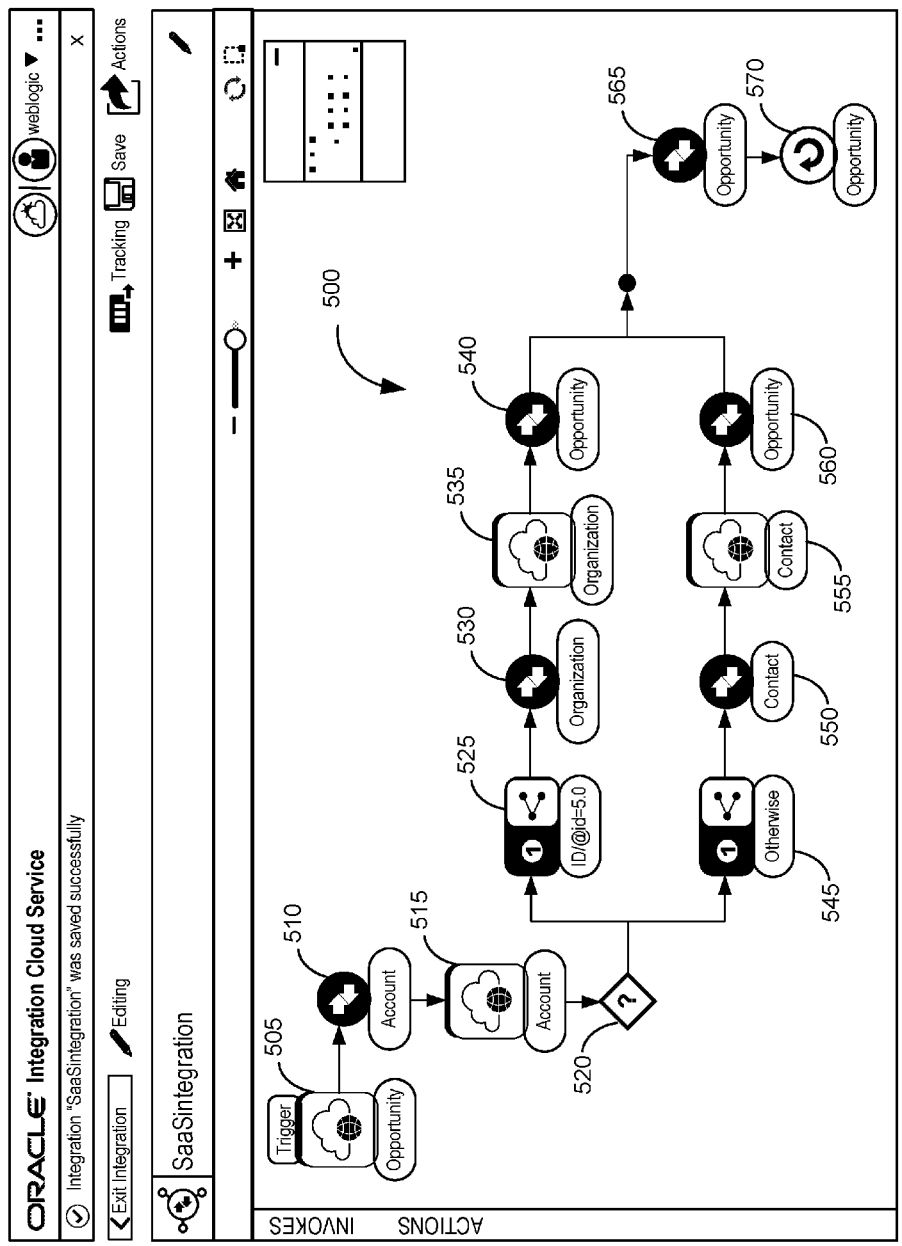
FIG. 5 illustrates an integration flow, in accordance with some example embodiments.

FIG. 5 illustrates an integration flow 500, in accordance with some example embodiments. As shown in FIG. 5, there are several activities, some of which introduce objects into the flow while others leverage those objects. Activity 505 introduces the Opportunity (Request and Response) objects into the integration flow. Activity 515 introduces the Account object into the integration flow. Activity 535 introduces the Organization object into the integration flow. Activity 555 introduces the Contact object into the integration flow. Activities 510, 525, 530, 540, 545, 550, 560, 565, and 570 each leverage the objects introduced as described further herein. Although all of the objects are known to the integration flow, not all of the objects are available for usage at all points in the flow. For each of the Activities 505, 510, 515, 525, 530, 535, 540, 545, 550, 555, 560, 565, and 570, the available configuration options for the configuration parameters differ, such as for example, the input and/or output configuration parameters. The visual design tool can display to the user through the visual design tool interface only the objects that are available for usage by the particular activity at the point in which it occurs in the integration flow.

Activity 510 is a mapping activity for mapping between available input objects and available output objects. At this point in the integration flow 500 (the location of activity 510 in the integration flow 500), the only available input object is the Opportunity Request object based on the Activity 505 and the only available output objects are the Account object (based on Activity 515) and the Opportunity Response object (based on Activity 505). Selection of Activity 510 for configuration can, for example, launch the structure analyzer 120 of FIG. 1 to begin performance of the flow diagram 200 of FIG. 2. The computer system executing the visual design tool used to develop integration flow 500 can determine, based on execution of flow diagram 200, that the available input object for Activity 510 is the Opportunity Request object by identifying the structure of the integration flow 500, querying each node preceding Activity 510, and, based on the query, generating the available options for the input configuration parameter for Activity 510. In this case, the available option for the input configuration parameter for Activity 510 is the Opportunity Request object. Further, the computer system can determine, based on execution of flow diagram 200, that the available output objects for configuration of the output configuration parameter of Activity 510 are the Account object and the Opportunity Response object by identifying the structure of the integration flow 500 and querying each node in the structure that can receive as input the output of Activity 510 at runtime. The output of Activity 510 can be one of the inputs to a downstream activity. Based on the query, the computer system can generate the available options for the output configuration parameter for Activity 510. In this case, the available options for the output configuration parameter for Activity 510 are the Opportunity Response object and the Account object.

Figure 6:
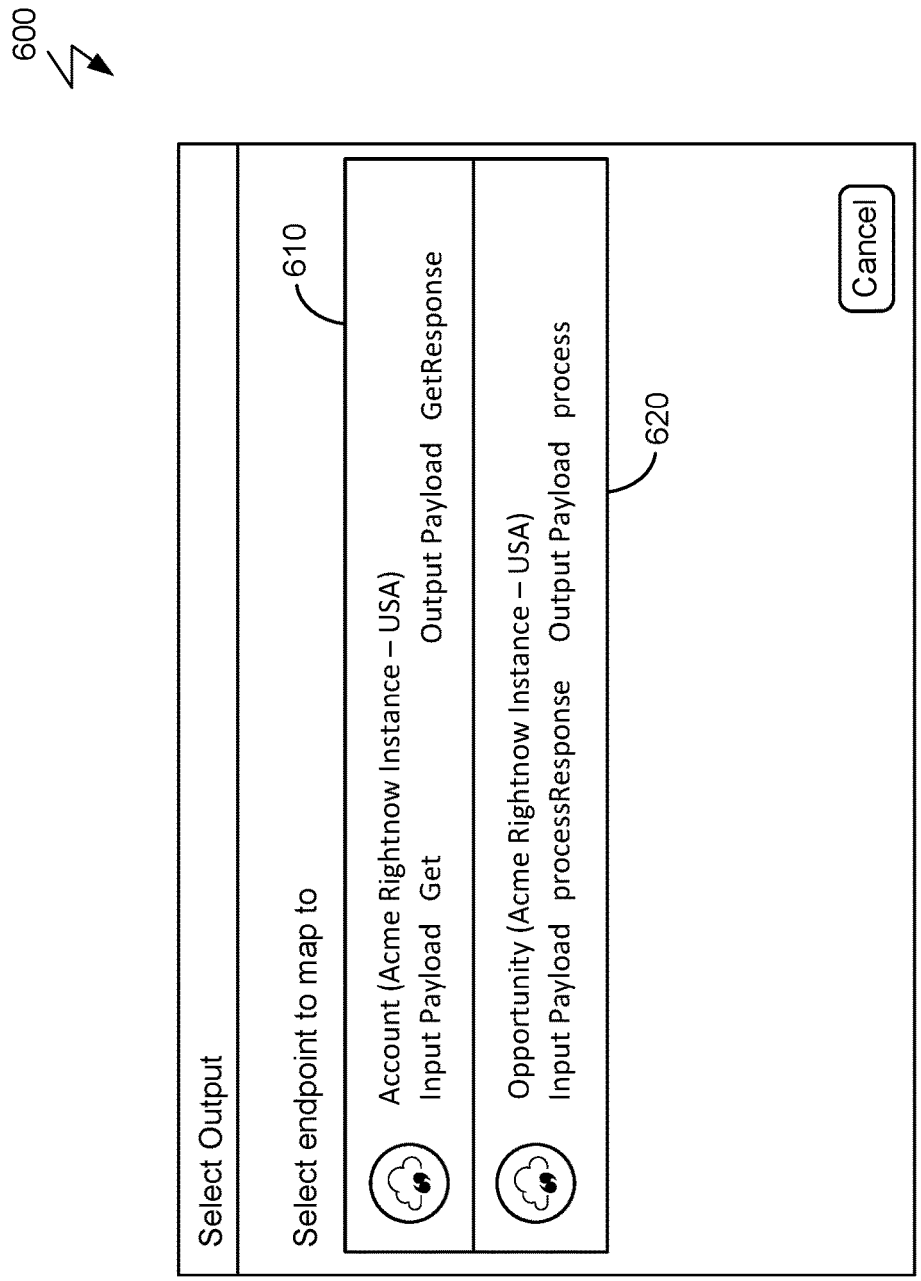
FIG. 6 illustrates a selection screen for selecting an available object, in accordance with some example embodiments.

FIG. 6 illustrates a selection screen 600 for selecting an available object, in accordance with some example embodiments. Selection screen 600 can be displayed in the visual design tool interface upon selection of the Activity 510 for configuration of the output configuration parameter. As shown, the Organization object and the Contact object are not presented as output options. Rather, the Account object 610 and the Opportunity Response object 620 are presented as the options for selection. Note that the Organization object and the Contact object are introduced later in the integration flow 500 within different branches of a switch activity (Activities 520, 525, and 530). During development, it may not be known which branch will be executed at runtime. Because the branch that will execute is unknown, the Organization object and Contact object are not presented as available output objects for configuration of the output configuration parameter of Activity 510.

Figure 7:
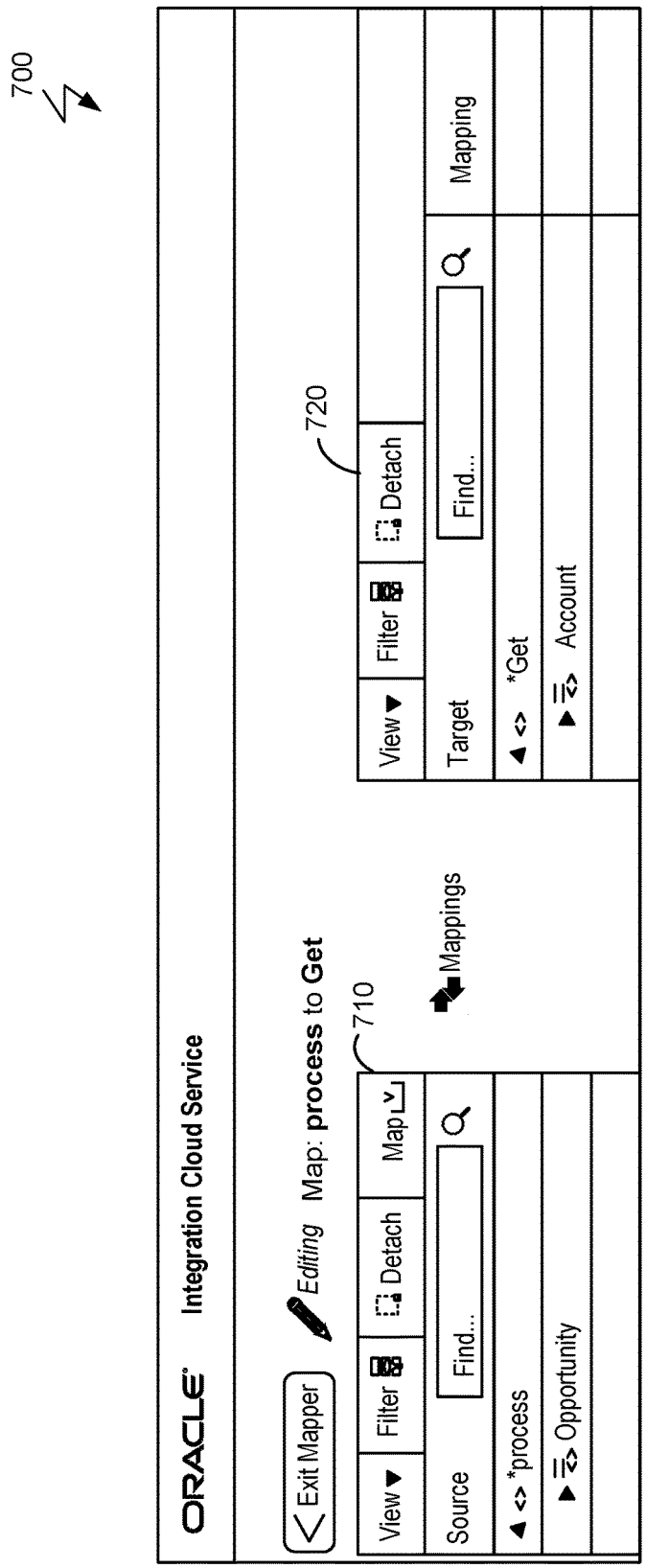
FIG. 7 illustrates mapping activity in accordance with some example embodiments.

FIG. 7 illustrates a mapping activity 700 in accordance with some example embodiments. Mapping activity 700 can be displayed in the visual design tool interface upon selection of the Activity 510 for configuration. The configured inputs are shown in input section 710 and the configured outputs are shown in output section 720. In this example, the configured input can be the Opportunity Request object and the configured output can be the Account object 610 that was selected in selection screen 600 of FIG. 6.

Activities 520, 525, and 545 can be a switch activity allowing selective processing. Activity 520 simply identifies the beginning of the branch. The example depicted in FIG. 5 can include two branches, one of which will be executed at runtime based on the result of the switch criteria. Depending on the switch criteria at runtime, execution will proceed through the branch beginning at Activity 525 (if the id=5) or through the branch beginning at Activity 545 (the otherwise case). Similar to the inputs of a mapping activity, such as Activity 510 discussed above, only the available input objects may be presented for selection.

Figure 8:
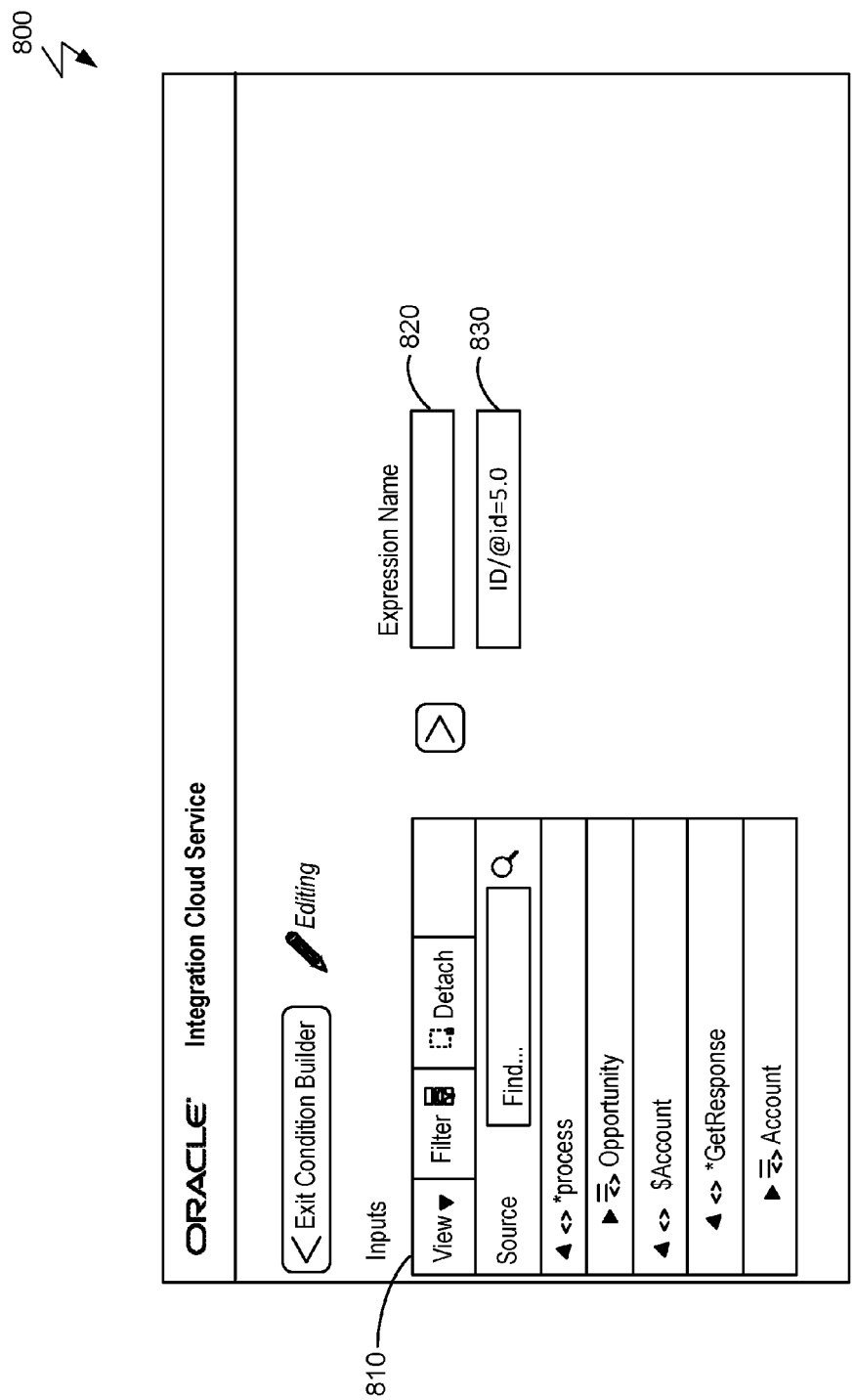
FIG. 8 illustrates the display of available input objects, in accordance with some example embodiments.

FIG. 8 illustrates a condition builder 800, in accordance with some example embodiments. At the location of Activity 520 in the integration flow 500 only the Opportunity Request and Account objects are available as input objects for configuration of the input configuration parameter. Other objects (i.e., objects from Activities 535 and 555) will not have been populated at this point in the integration flow 500 and therefore are not made available as inputs. The computer system executing the visual development tool can determine the available input objects based on the execution of, for example, flow diagram 200 of FIG. 2 and/or flow diagram 300 of FIG. 3. Condition builder 800 can allow the user to develop the conditions under which different branches of the integration flow 500 will execute at runtime. Condition builder 800 can be displayed upon selection of Activity 525 and/or 545 for configuration. The Opportunity Request object can be selected as an input object in input section 810. In some embodiments, selection of the output object can be through a selection screen such as selection screen 600 of FIG. 6 prior to display of the condition builder 800. At entry box 820, the condition for the input object can be entered. As shown at expression box 830, the expression can be displayed as currently configured. During runtime, if the expression evaluates to true, the branch beginning with the activity selected for configuration will execute.

Activity 530 can be a mapping activity for mapping between available input objects and available output objects. At this point in the integration flow 500 (the location of Activity 530 in the integration flow 500), the available input objects can include the Opportunity Request object (based on Activity 505) and the Account object (based on Activity 515) and the available output objects can be the Organization object (based on Activity 535) and Opportunity Response Object (based on Activity 505). The computer system executing the visual design tool used to develop integration flow 500 can determine, based on execution of flow diagram 200, that the available input objects for Activity 530 are the Opportunity Request object and the Account object by identifying the structure of the integration flow 500, querying each node preceding Activity 530, and, based on the query, generating the available options for the input configuration parameter for Activity 530. In this case, the available options for the input configuration parameter for Activity 530 are the Opportunity Request object (based on Activity 505) and the Account object (based on Activity 515). Further, the computer system can determine, based on execution of flow diagram 200, that the available output objects for configuration of the output configuration parameter of Activity 530 are Organization object and Opportunity Response Object by identifying the structure of the integration flow 500 and querying each node in the structure that can receive as input the output of Activity 530 at runtime. The output of Activity 530 can be one of the inputs to a downstream activity. Based on the query, the computer system can generate the available options for the output configuration parameter for Activity 530. In this case, the available options for the output configuration parameter for Activity 530 are Organization object (based on Activity 535) and Opportunity Response Object (based on Activity 505).

Figure 9:
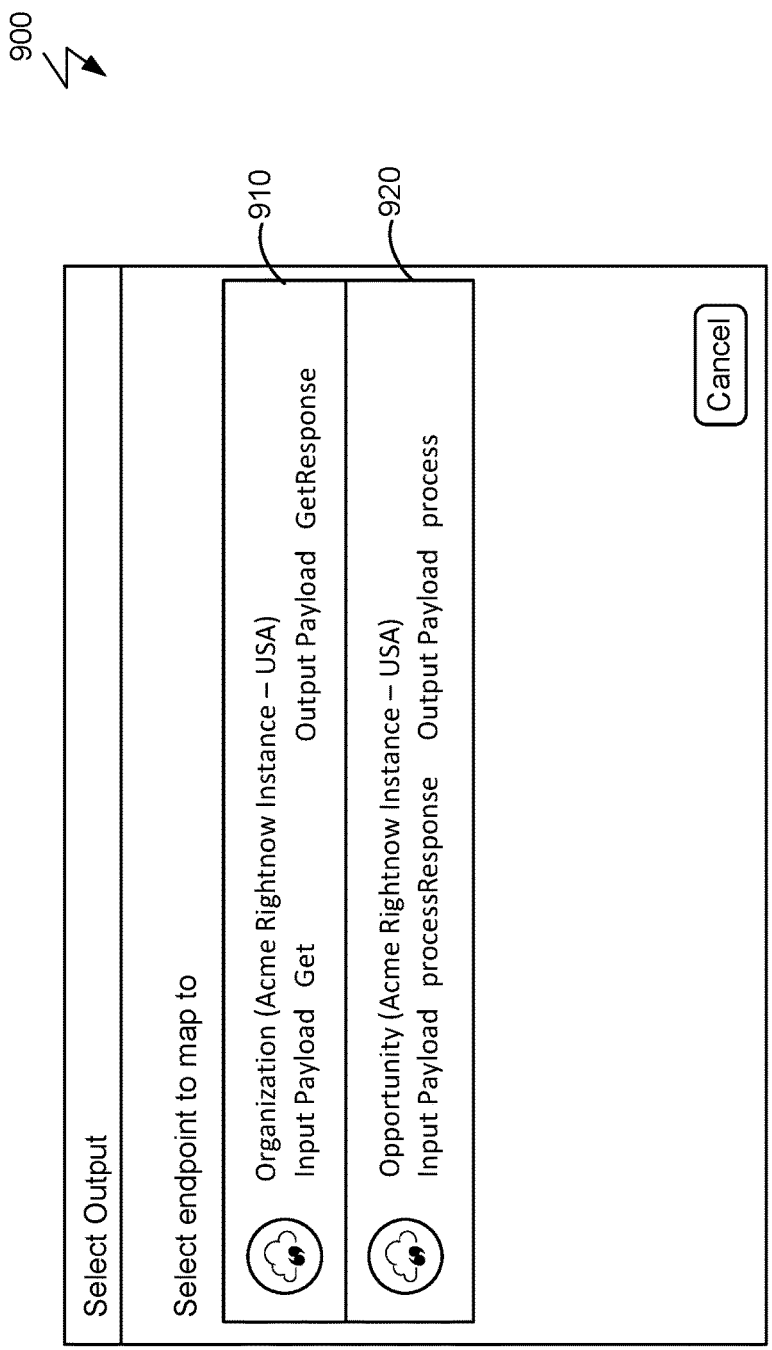
FIG. 9 illustrates the display of available output objects, in accordance with some example embodiments.

FIG. 9 illustrates a selection screen 900 that displays available output objects, in accordance with some example embodiments. For example, the selection screen 900 can be displayed by the visual design tool interface to the user upon selection of the Activity 530 of FIG. 5 for configuration of the output configuration parameter. As shown, the Account object and the Contact object are not presented as output options. Rather, the Organization object 910 and the Opportunity Response object 920 are presented as the options for selection. Because the Contact object appears in a different branch of the switch Activity 520, the Contact object is not presented as an available output object for configuration of the output configuration parameter of Activity 530. Because the Account Object (based on Activity 515) appears prior to the Activity 530, it is not a selectable object for configuration of the output configuration parameter of Activity 530. The visual design tool can determine the appropriate output objects available for use to configure the output configuration parameter of Activity 530 by executing, for example, flow diagram 200 of FIG. 2 and/or flow diagram 400 of FIG. 4.

Figure 10:
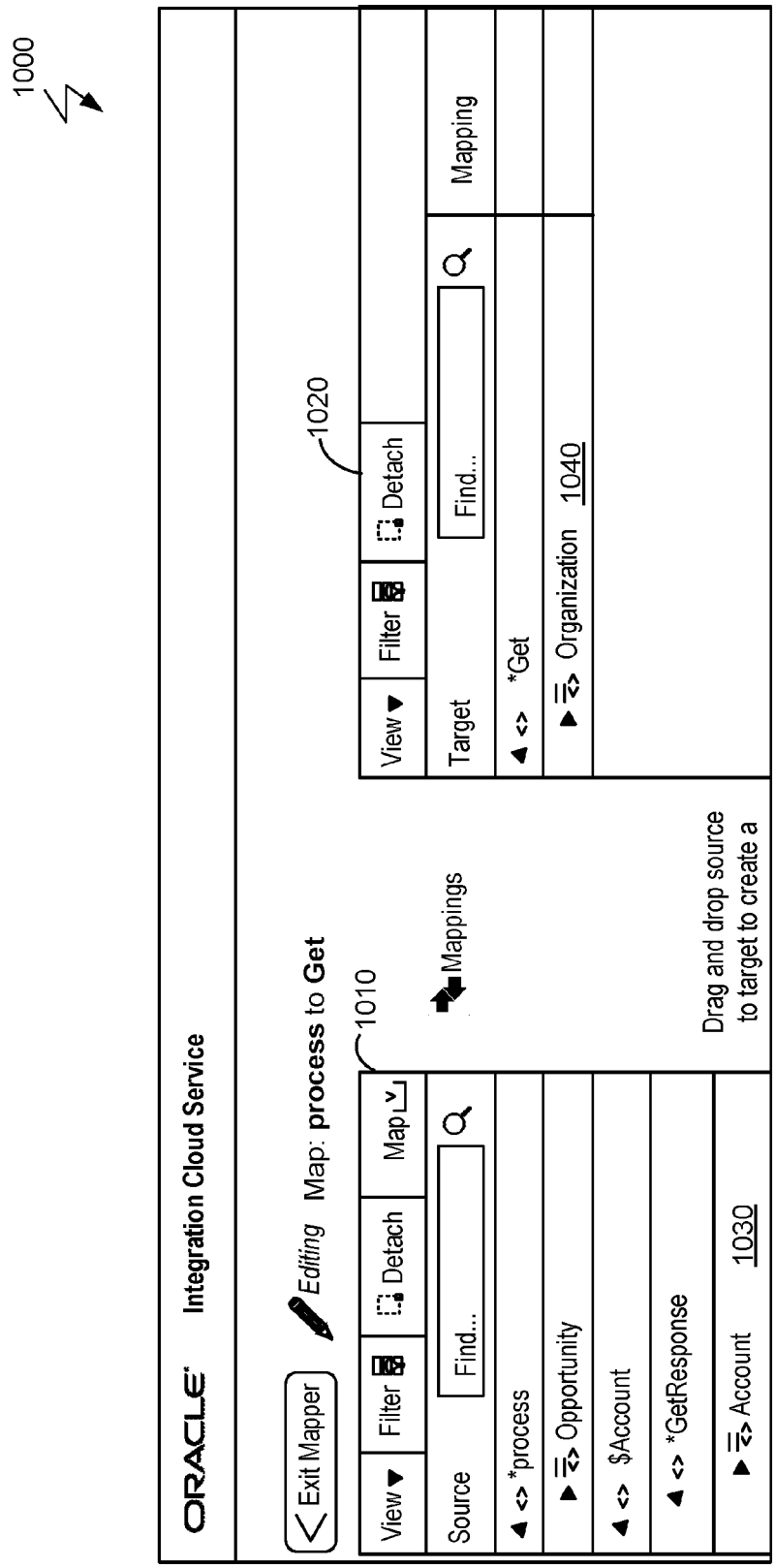
FIG. 10 illustrates mapping activity, in accordance with some example embodiments.

FIG. 10 illustrates a mapping activity 1000, in accordance with some example embodiments. Mapping activity 1000 can be displayed in the visual design tool interface upon selection of the Activity 530 for configuration after selection of the output object in selection screen 900. The configured inputs are shown in input section 1010 and the configured outputs are shown in output section 1020. In this example, the configured input can be the Account object 1030 and the configured output can be the Organization object 1040. The available options for the input configuration parameter and the output configuration parameter for Activity 530 can be generated by execution of, for example, flow diagram 200 of FIG. 2, flow diagram 300 of FIG. 3, and/or flow diagram 400 of FIG. 4.

Activity 540 can be a mapping activity for mapping between available input objects and available output objects. At this point in the integration flow 500 (the location of Activity 540 in the integration flow 500), the available input objects can include the Opportunity Request object (based on Activity 505), the Account object (based on Activity 515), and the Organization object (based on Activity 535). The available output object can be the Opportunity Response Object (based on Activity 505). The computer system executing the visual design tool used to develop integration flow 500 can determine, based on execution of flow diagram 200, that the available input objects for Activity 540 are the Opportunity Request object, the Account object, and the Organization object by identifying the structure of the integration flow 500, querying each node preceding Activity 540, and, based on the query, generating the available options for the input configuration parameter for Activity 540. In this case, the available options for the input configuration parameter for Activity 540 are the Opportunity Request object (based on Activity 505), the Account object (based on Activity 515), and the Organization object (based on Activity 535). Further, the computer system can determine, based on execution of flow diagram 200, that the available output object for configuration of the output configuration parameter of Activity 540 is the Opportunity Response Object by identifying the structure of the integration flow 500 and querying each node in the structure that can receive as input the output of Activity 540 at runtime. The output of Activity 540 can be one of the inputs to a downstream activity. Based on the query, the computer system can generate the available options for the output configuration parameter for Activity 540. In this case, the available option for the output configuration parameter for Activity 540 is the Opportunity Response Object (based on Activity 505).

Figure 11:
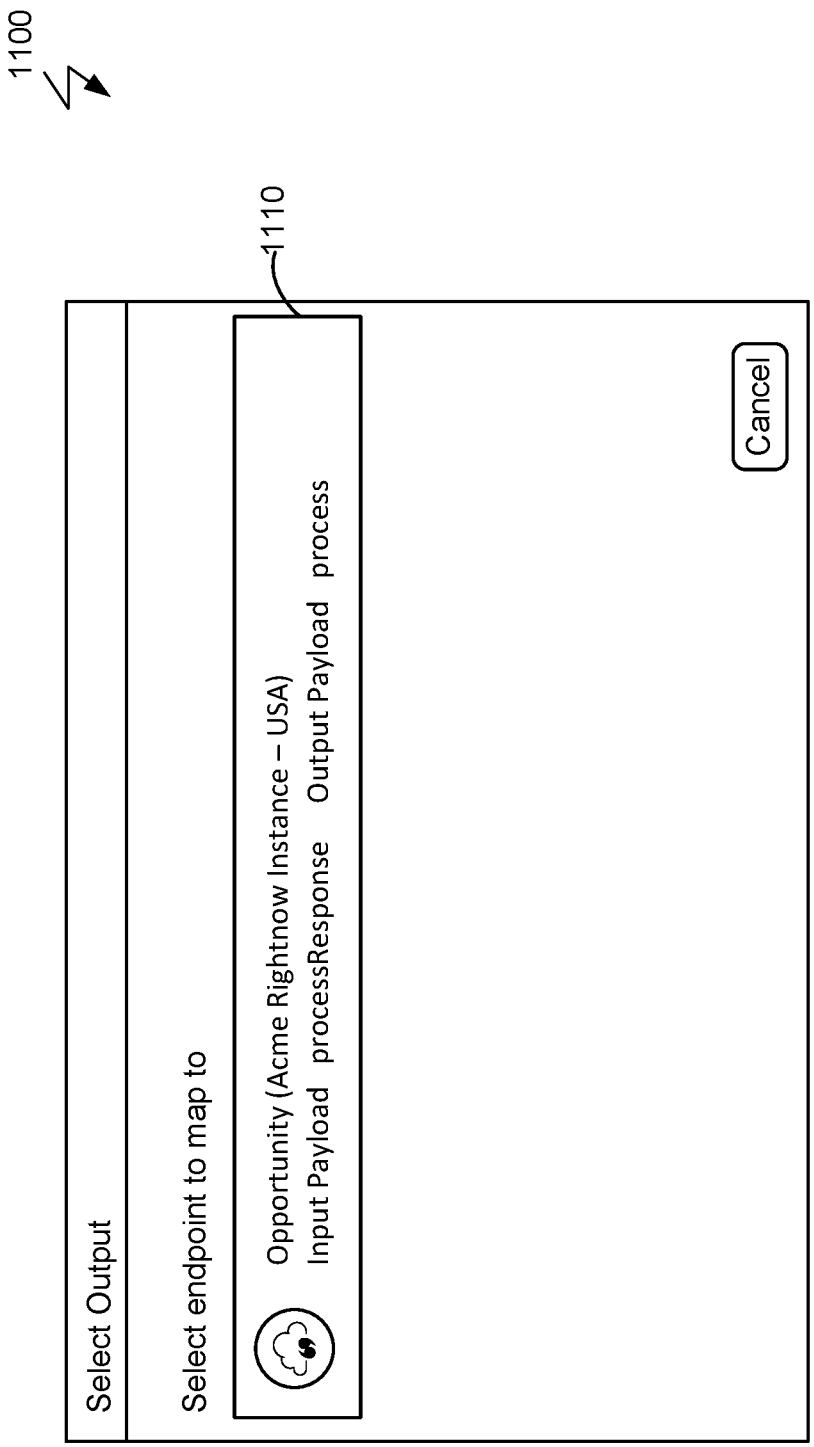
FIG. 11 illustrates the display of available output objects, in accordance with some example embodiments.

FIG. 11 illustrates a selection screen 1100 that displays available output objects, in accordance with some example embodiments. For example, the selection screen 1100 can be displayed by the visual design tool interface to the user upon selection of the Activity 540 of FIG. 5 for configuration of the output configuration parameter. As shown, the Account object, the Organization object, and the Contact object are not presented as output options. Rather, the Opportunity Response object 1110 is presented as the option for selection. Because the Contact object appears in a different branch of the switch Activity 520, the Contact object is not presented as an available output object for configuration of the output configuration parameter of Activity 540. Because the Account object (based on Activity 515) and the Organization object (based on Activity 535) each appear prior to the Activity 540, the Account object and the Organization object are not selectable objects for configuration of the output configuration parameter of Activity 540. The visual design tool can determine the appropriate output objects available for use to configure the output configuration parameter of Activity 540 by executing, for example, flow diagram 200 of FIG. 2 and/or flow diagram 400 of FIG. 4.

Figure 12:
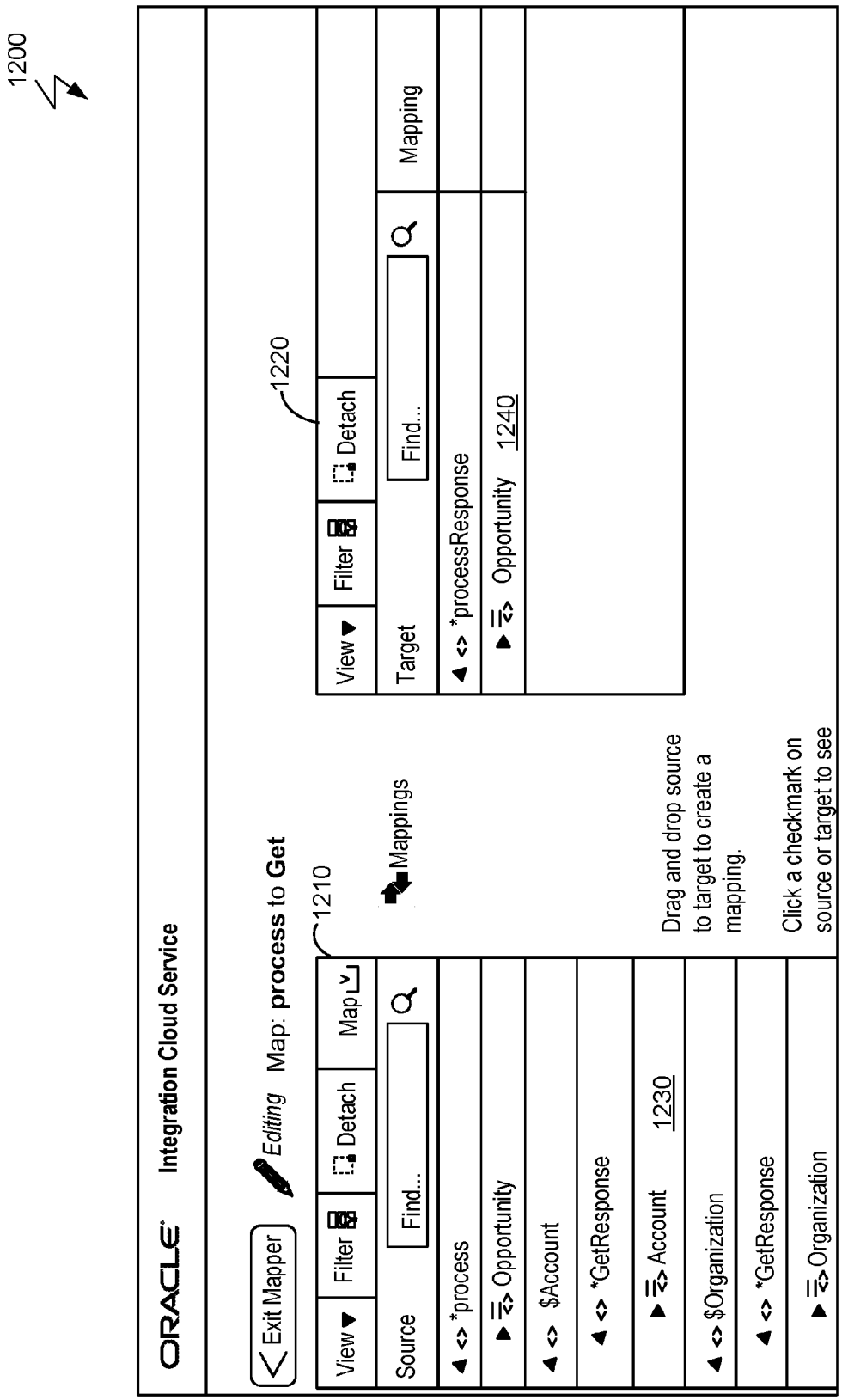
FIG. 12 illustrates mapping activity, in accordance with some example embodiments.

FIG. 12 illustrates a mapping activity 1200, in accordance with some example embodiments. Mapping activity 1200 can be displayed in the visual design tool interface upon selection of the Activity 540 for configuration and after selection of the output configuration parameter in selection screen 1000. The configured inputs are shown in input section 1210 and the configured outputs are shown in output section 1220. In this example, the configured input can be the Account object 1230 and the configured output can be the Organization object 1240. The available options for the input configuration parameter and the output configuration parameter for Activity 540 can be generated by execution of, for example, flow diagram 200 of FIG. 2, flow diagram 300 of FIG. 3, and/or flow diagram 400 of FIG. 4.

Activity 550 can be a mapping activity for mapping between available input objects and available output objects. At this point in the integration flow 500 (the location of Activity 550 in the integration flow 500), the available input objects can include the Opportunity Request object (based on Activity 505) and the Account object (based on Activity 515). The available output objects can be the Opportunity Response Object (based on Activity 505) and the Contact object (based on Activity 555). The computer system executing the visual design tool used to develop integration flow 500 can determine, based on execution of flow diagram 200, that the available input objects for Activity 550 are the Opportunity Request object and the Account object by identifying the structure of the integration flow 500, querying each node preceding Activity 550, and, based on the query, generating the available options for the input configuration parameter for Activity 550. In this case, the available options for the input configuration parameter for Activity 550 are the Opportunity Request object (based on Activity 505) and the Account object (based on Activity 515). Further, the computer system can determine, based on execution of flow diagram 200, that the available output objects for configuration of the output configuration parameter of Activity 550 are the Opportunity Response Object and the Contact object by identifying the structure of the integration flow 500 and querying each node in the structure that can receive as input the output of Activity 550 at runtime. The output of Activity 550 can be one of the inputs to a downstream activity. Based on the query, the computer system can generate the available options for the output configuration parameter for Activity 550. In this case, the available options for the output configuration parameter for Activity 540 are the Opportunity Response Object (based on Activity 505) and the Contact object (based on Activity 555).

Figure 13:
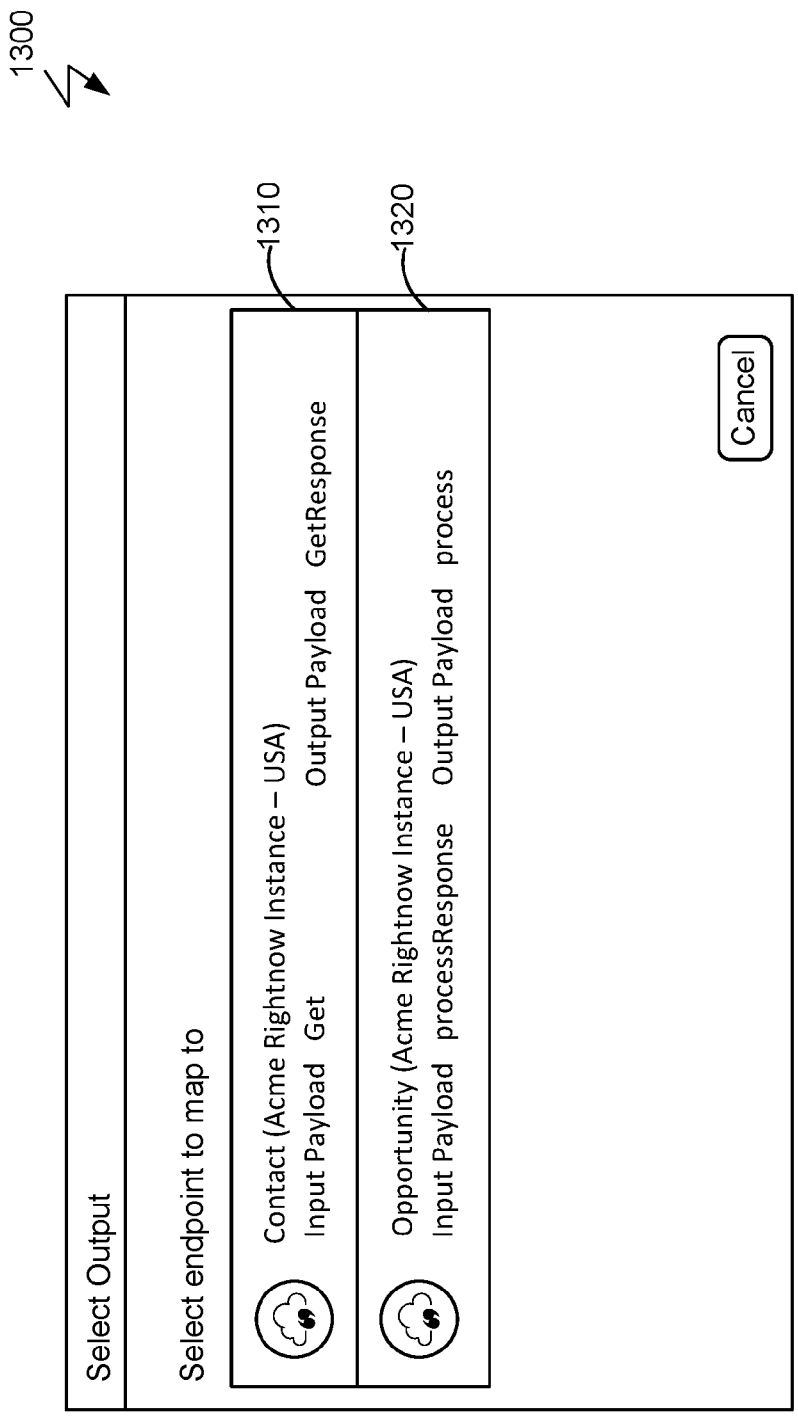
FIG. 13 illustrates the display of available output objects, in accordance with some example embodiments.

FIG. 13 illustrates a selection screen 1300 that displays available output objects, in accordance with some example embodiments. For example, the selection screen 1300 can be displayed by the visual design tool interface to the user upon selection of the Activity 550 of FIG. 5 for configuration of the output configuration parameter. As shown, the Account object and the Organization object are not presented as output options. Rather, the Opportunity Response object 1320 and the Contact object 1310 are presented as the options for selection. Because the Organization object (based on Activity 535) appears in a different branch of the switch Activity 520, the Organization object is not presented as an available output object for configuration of the output configuration parameter of Activity 550. Because the Account object (based on Activity 515) appears prior to the Activity 550, the Account object is not a selectable object for configuration of the output configuration parameter of Activity 550. The visual design tool can determine the appropriate output objects available for use to configure the output configuration parameter of Activity 550 by executing, for example, flow diagram 200 of FIG. 2 and/or flow diagram 400 of FIG. 4.

Figure 14:
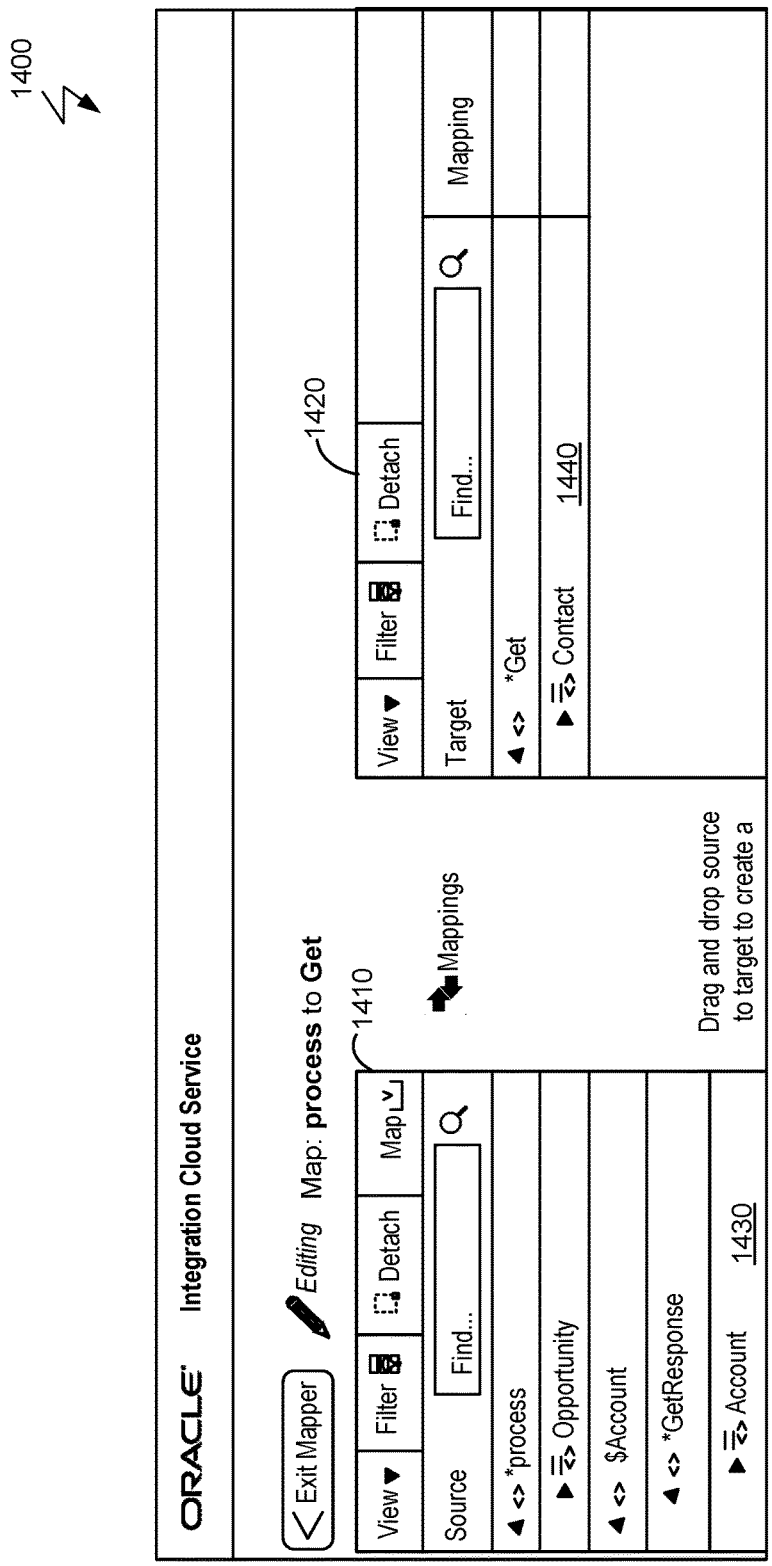
FIG. 14 illustrates mapping activity, in accordance with some example embodiments.

FIG. 14 illustrates a mapping activity 1400, in accordance with some example embodiments. Mapping activity 1400 can be displayed in the visual design tool interface upon selection of the Activity 550 for configuration and after selection of the output configuration parameter in selection screen 1300. The configured inputs are shown in input section 1410 and the configured outputs are shown in output section 1420. In this example, the configured input can be the Account object 1430 and the configured output can be the Contact object 1440. The available options for the input configuration parameter and the output configuration parameter for Activity 550 can be generated by execution of, for example, flow diagram 200 of FIG. 2, flow diagram 300 of FIG. 3, and/or flow diagram 400 of FIG. 4.

Activity 560 can be a mapping activity for mapping between available input objects and available output objects.

At this point in the integration flow 500 (the location of Activity 560 in the integration flow 500), the available input objects can include the Opportunity Request object (based on Activity 505), the Account object (based on Activity 515), and the Contact object (based on Activity 555). The available output object can be the Opportunity Response Object (based on Activity 505). The computer system executing the visual design tool used to develop integration flow 500 can determine, based on execution of flow diagram 200, that the available input objects for Activity 560 are the Opportunity Request object, the Account object, and the Contact object by identifying the structure of the integration flow 500, querying each node preceding Activity 560, and, based on the query, generating the available options for the input configuration parameter for Activity 560. In this case, the available options for the input configuration parameter for Activity 560 are the Opportunity Request object (based on Activity 505), the Account object (based on Activity 515), and the Contact object (based on Activity 555). Further, the computer system can determine, based on execution of flow diagram 200, that the available output object for configuration of the output configuration parameter of Activity 560 is the Opportunity Response Object by identifying the structure of the integration flow 500. The output of 560 can be one of the downstream activity inputs. Based on the query, the computer system can generate the available options for the output configuration parameter for Activity 560. In this case, the available option for the output configuration parameter for Activity 560 is the Opportunity Response Object (based on Activity 505).

Figure 15:
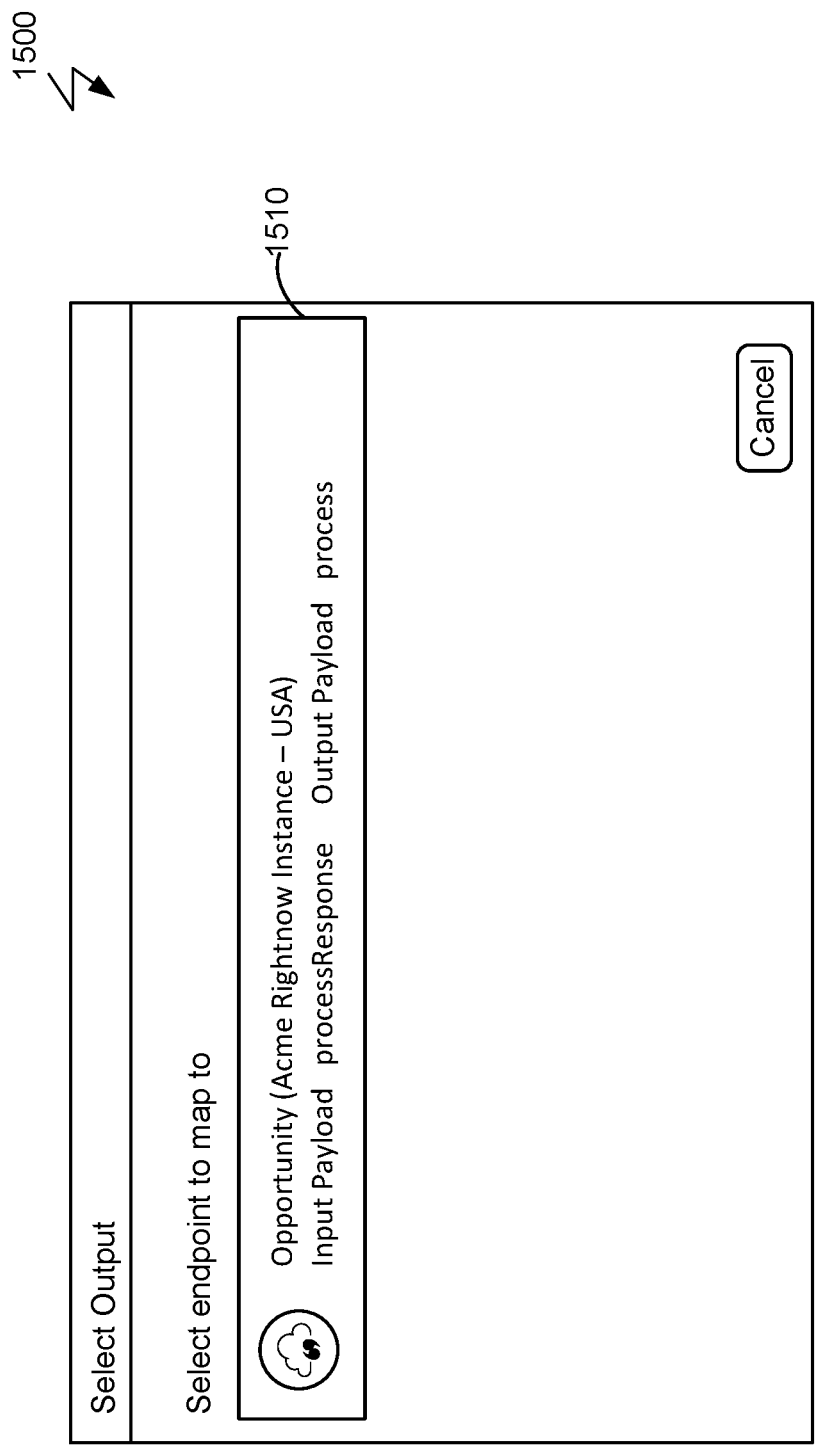
FIG. 15 illustrates the display of available output objects, in accordance with some example embodiments.

FIG. 15 illustrates a selection screen 1500 that displays available output objects, in accordance with some example embodiments. For example, the selection screen 1500 can be displayed by the visual design tool interface to the user upon selection of the Activity 560 of FIG. 5 for configuration of the output configuration parameter. As shown, the Account object, the Organization object, and the Contact object are not presented as output options. Rather, the Opportunity Response object 1510 is presented as the option for selection. Because the Organization object (based on Activity 535) appears in a different branch of the switch Activity 520, the Organization object is not presented as an available output object for configuration of the output configuration parameter of Activity 560. Because the Account object (based on Activity 515) and the Contact object (based on Activity 555) each appear prior to the Activity 560, the Account object and the Contact object are not selectable objects for configuration of the output configuration parameter of Activity 560. The visual design tool can determine the appropriate output objects available for use to configure the output configuration parameter of Activity 560 by executing, for example, flow diagram 200 of FIG. 2 and/or flow diagram 400 of FIG. 4.

Figure 16:
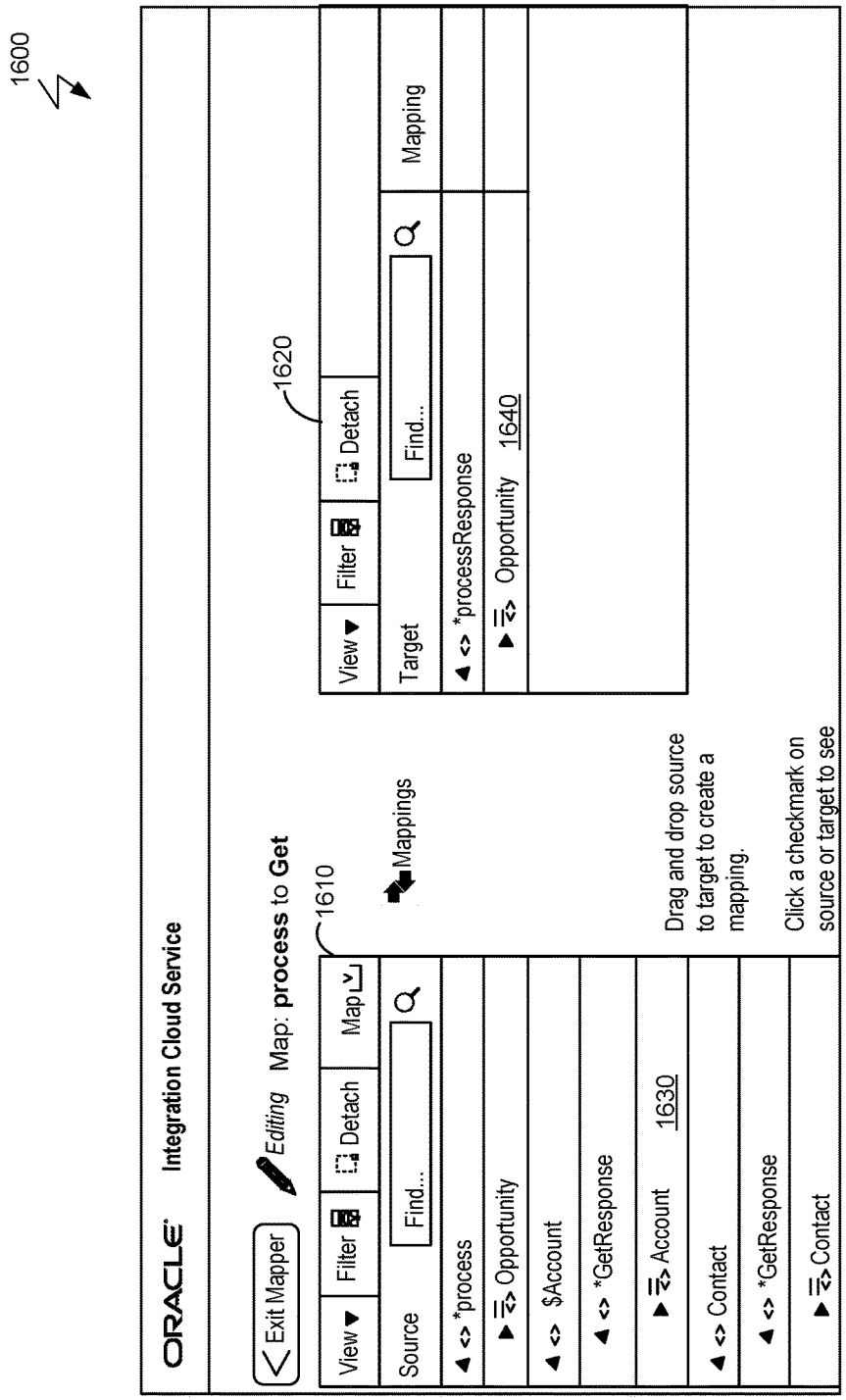
FIG. 16 illustrates mapping activity, in accordance with some example embodiments.

FIG. 16 illustrates a mapping activity 1600, in accordance with some example embodiments. Mapping activity 1600 can be displayed in the visual design tool interface upon selection of the Activity 560 for configuration and after selection of the output configuration parameter in selection screen 1500. The configured inputs are shown in input section 1610 and the configured outputs are shown in output section 1620. In this example, the configured input can be the Account object 1630 and the configured output can be the Opportunity object 1640. The available options for the input configuration parameter and the output configuration parameter for Activity 560 can be generated by execution of, for example, flow diagram 200 of FIG. 2, flow diagram 300 of FIG. 3, and/or flow diagram 400 of FIG. 4.

Activity 565 can be a mapping activity for mapping between available input objects and available output objects. At this point in the integration flow 500 (the location of Activity 560 in the integration flow 500), the available input objects can include the Opportunity Request object (based on Activity 505) and the Account object (based on Activity 515. The available output object can be the Opportunity Response Object (based on Activity 505). The computer system executing the visual design tool used to develop integration flow 500 can determine, based on execution of flow diagram 200, that the available input objects for Activity 565 are the Opportunity Request object and the Account object by identifying the structure of the integration flow 500, querying each node preceding Activity 565, and, based on the query, generating the available options for the input configuration parameter for Activity 565. In this case, the available options for the input configuration parameter for Activity 565 are the Opportunity Request object (based on Activity 505) and the Account object (based on Activity 515). The Contact object (based on Activity 555) and the Organization object (based on Activity 535) are not available as options for input because it is not known which branch of the switch Activity 520 will execute at runtime. Further, the computer system can determine, based on execution of flow diagram 200, that the available output object for configuration of the output configuration parameter of Activity 565 is the Opportunity Response Object by identifying the structure of the integration flow 500 and querying each node in the structure that can receive as input the output of Activity 565 at runtime. The output of Activity 565 can be one of the inputs to a downstream activity. Based on the query, the computer system can generate the available options for the output configuration parameter for Activity 565. In this case, the available option for the output configuration parameter for Activity 565 is the Opportunity Response Object (based on Activity 505).

Figure 17:
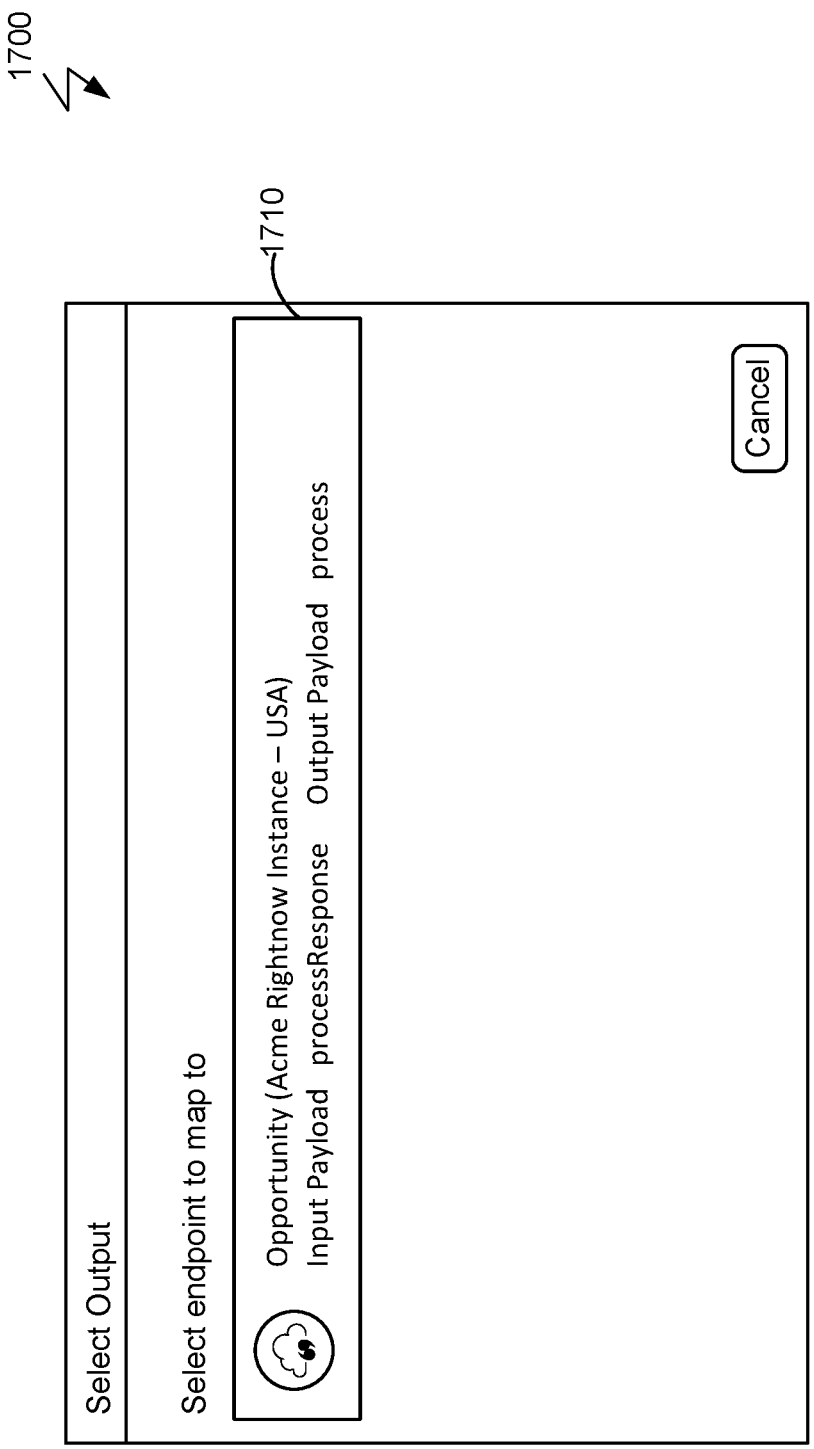
FIG. 17 illustrates the display of available output objects, in accordance with some example embodiments.

FIG. 17 illustrates a selection screen 1700 that displays available output objects, in accordance with some example embodiments. For example, the selection screen 1700 can be displayed by the visual design tool interface to the user upon selection of the Activity 565 of FIG. 5 for configuration of the output configuration parameter. As shown, the Account object, the Organization object, and the Contact object are not presented as output options. Rather, the Opportunity Response object 1710 is presented as the option for selection. Because the Organization object (based on Activity 535), the Account object (based on Activity 515), and the Contact object (based on Activity 555) each appear prior to the Activity 565, the Organization object, the Account object, and the Contact object are not selectable objects for configuration of the output configuration parameter of Activity 560. The visual design tool can determine the appropriate output objects available for use to configure the output configuration parameter of Activity 565 by executing, for example, flow diagram 200 of FIG. 2 and/or flow diagram 400 of FIG. 4.

Figure 18:
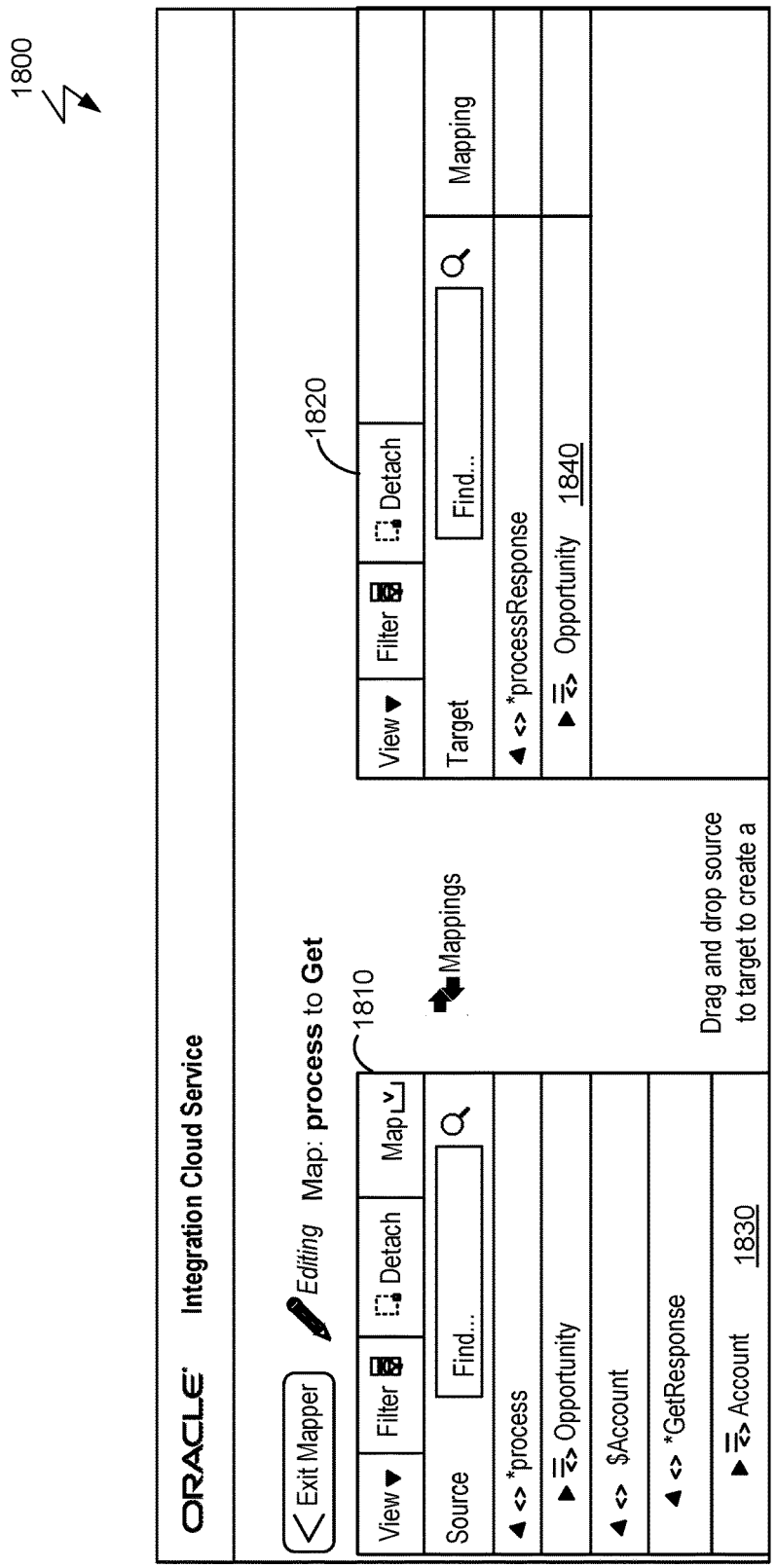
FIG. 18 illustrates mapping activity, in accordance with some example embodiments.

FIG. 18 illustrates a mapping activity 1800, in accordance with some example embodiments. Mapping activity 1800 can be displayed in the visual design tool interface upon selection of the Activity 565 for configuration and after selection of the output configuration parameter in selection screen 1700. The configured inputs are shown in input section 1810 and the configured outputs are shown in output section 1820. In this example, the configured input can be the Account object 1830 and the configured output can be the Opportunity object 1840. The available options for the input configuration parameter and the output configuration parameter for Activity 565 can be generated by execution of, for example, flow diagram 200 of FIG. 2, flow diagram 300 of FIG. 3, and/or flow diagram 400 of FIG. 4.

Figure 19:
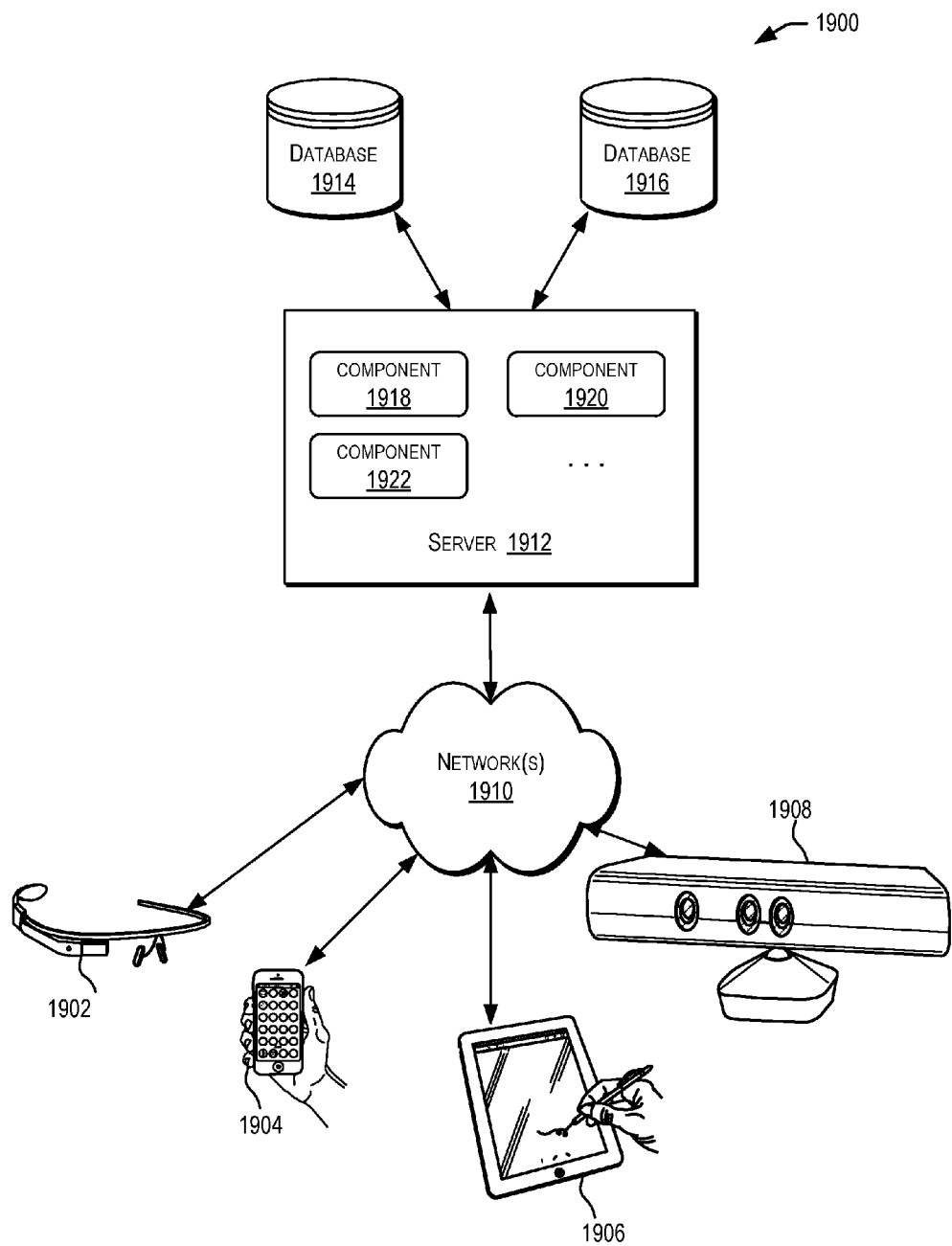
FIG. 19 depicts a simplified diagram of a distributed system, in accordance with some example embodiments.
Figure 20:
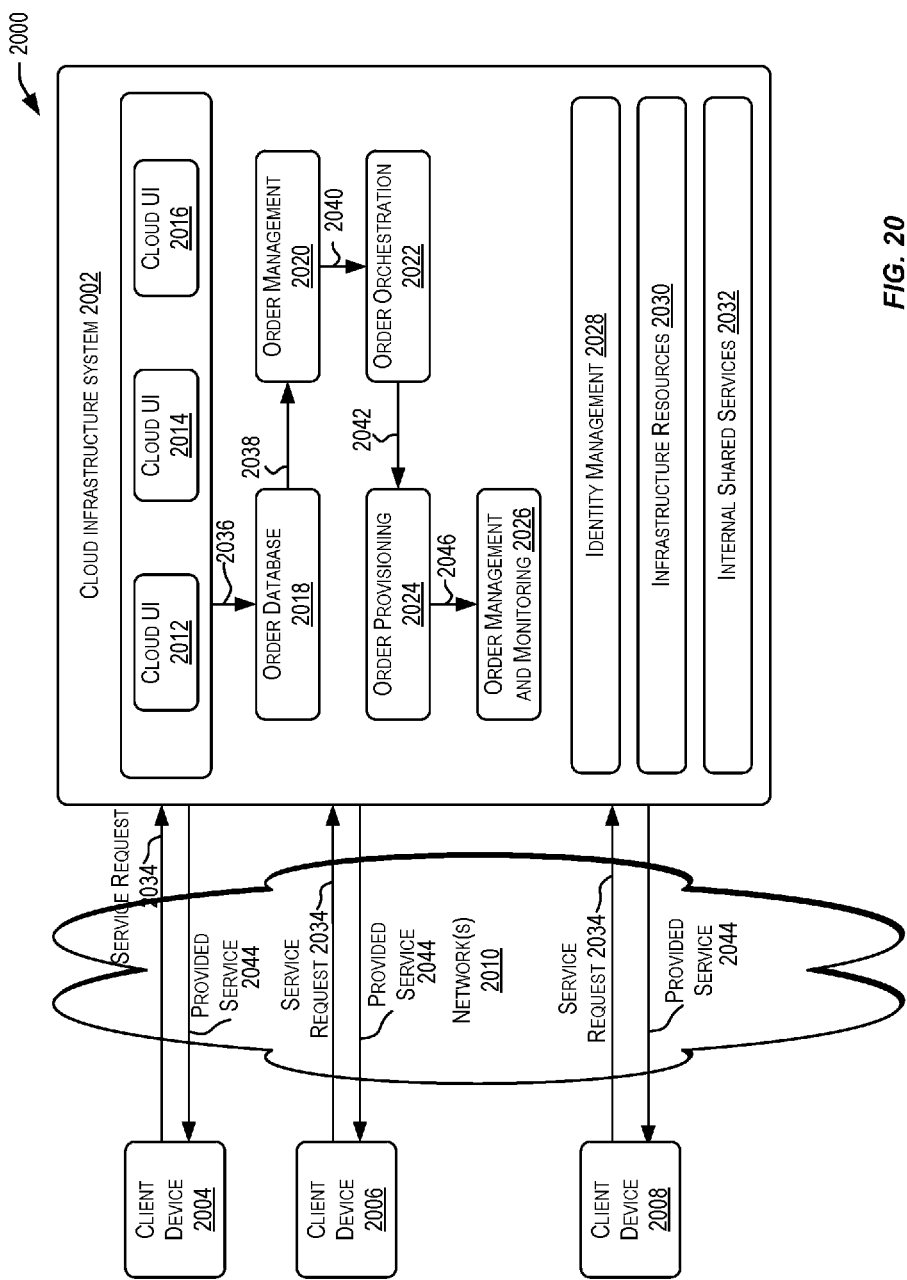
FIG. 20 is a simplified block diagram of one or more components of a system environment in which services may be offered as cloud services, in accordance with some example embodiments.

FIGS. 19, 20, and 21 illustrate exemplary hardware and/or software configurations used in various embodiments.

FIG. 19 illustrates a simplified diagram of a distributed system for implementing some example embodiments. In the illustrated embodiment, distributed system 1900 includes one or more client computing devices 1902, 1904, 1906, and 1908, which are configured to execute and operate a client application such as a web browser, proprietary client (e.g., Oracle Forms), or the like over one or more network(s) 1910. Server 1912 may be communicatively coupled with remote client computing devices 1902, 1904, 1906, and 1908 via network 1910.

In various embodiments, server 1912 may be adapted to run one or more services or software applications such as services and applications that provide code and/or data for performing controlled availability of objects in the visual development tool executing at the server 1912 or another server. In certain embodiments, server 1912 may also provide other services or software applications that can include non-virtual and virtual environments. In some embodiments, these services may be offered as web-based or cloud services or under a Software as a Service (SaaS) model to the users of client computing devices 1902, 1904, 1906, and/or 1908. Users operating client computing devices 1902, 1904, 1906, and/or 1908 may in turn utilize one or more client applications to interact with server 1912 to utilize the services provided by these components.

In the configuration depicted in FIG. 19, software components 1918, 1920 and 1922 of system 1900 are shown as being implemented on server 1912. As one example, one or more of the components (e.g., software component 1918) may be the visual development tool discussed throughout the application.

In other embodiments, one or more of the components of system 1900 and/or the services provided by these components may also be implemented by one or more of the client computing devices 1902, 1904, 1906, and/or 1908. Users operating the client computing devices may then utilize one or more client applications to use the services provided by these components. These components may be implemented in hardware, firmware, software, or combinations thereof. It should be appreciated that various different system configurations are possible, which may be different from distributed system 1900. The embodiment shown in FIG. 19 is thus one example of a distributed system for implementing an embodiment system and is not intended to be limiting.

Client computing devices 1902, 1904, 1906, and/or 1908 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1910.

Although distributed system 1900 in FIG. 19 is shown with four client computing devices, any number of client computing devices may be supported. Other devices, such as devices with sensors, etc., may interact with server 1912.

Communication network(s) 1910 in distributed system 1900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 170 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1912 can include one or more virtual machines running virtual operating systems, or other computing architectures involving virtualization. One or more flexible pools of logical storage devices can be virtualized to maintain virtual storage devices for the server. Virtual networks can be controlled by server 1912 using software defined networking. In various embodiments, server 1912 may be adapted to run one or more services or software applications described in the foregoing disclosure.

Server 1912 may run an operating system including any of those discussed above, as well as any commercially available server operating system. Server 1912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 1900 may also include one or more databases 1914 and 1916. These databases may provide a mechanism for storing information such as user interactions information, usage patterns information, adaptation rules information, and other information used by example embodiments. Databases 1914 and 1916 may reside in a variety of locations. By way of example, one or more of databases 1914 and 1916 may reside on a non-transitory storage medium local to (and/or resident in) server 1912. Alternatively, databases 1914 and 1916 may be remote from server 1912 and in communication with server 1912 via a network-based or dedicated connection. In one set of embodiments, databases 1914 and 1916 may reside in a storage-area network (SAN). Similarly, any necessary files for performing the functions attributed to server 1912 may be stored locally on server 1912 and/or remotely, as appropriate. In one set of embodiments, databases 1914 and 1916 may include relational databases, such as databases provided by Oracle, that are adapted to store, update, and retrieve data in response to SQL-formatted commands. However, databases 1914 and 1916 may provide relational databases, object-oriented databases, object-relational databases, NoSQL databases, etc., and may or may not be SQL-based. For example, databases 1914 and/or 1916 may be Oracle Database, PostgreSQL, Microsoft SQL Server, MySQL, MemSQL, Memcached, Redis, MongoDB, BigTable, Cassandra, DB2, Solr, etc.

FIG. 20 is a simplified block diagram of one or more components of a system environment 2000 in which services may be offered as cloud services, in accordance with some embodiments of the present disclosure. In the illustrated embodiment in FIG. 20, system environment 2000 includes one or more client computing devices 2004, 2006, and 2008 that may be used by users to interact with a cloud infrastructure system 2002 that provides cloud services. Additionally, in some embodiments the "client" computing devices 2004, 2006, 2008 may actually be server computers acting as a client in a client-server relationship. Cloud infrastructure system 2002 may comprise one or more computers and/or servers that may include those described above for server 1912.

It should be appreciated that cloud infrastructure system 2002 depicted in FIG. 20 may have other components than those depicted. Further, the embodiment shown in FIG. 20 is one example of a cloud infrastructure system that may incorporate an example embodiment. In some other embodiments, cloud infrastructure system 2002 may have more or fewer components than shown in the figure, may combine two or more components, or may have a different configuration or arrangement of components.

Client computing devices 2004, 2006, and 2008 may be devices similar to those described above for 1902, 1904, 1906, and 1908. Client computing devices 2004, 2006, and 2008 may be configured to operate a client application such as a web browser, a proprietary client application (e.g., Oracle Forms), or some other application, which may be used by a user of the client computing device to interact with cloud infrastructure system 2002 to use services provided by cloud infrastructure system 2002. Although exemplary system environment 2000 is shown with three client computing devices, any number of client computing devices may be supported. Other devices such as devices with sensors, etc. may interact with cloud infrastructure system 2002.

Communication network(s) 2010 may facilitate communications and exchange of data between clients 2004, 2006, and 2008 and cloud infrastructure system 2002. Each network may be any type of network familiar to those skilled in the art that can support data communications using any of a variety of commercially-available protocols, including those described above for communication network(s) 1910.

In certain embodiments, services provided by cloud infrastructure system 2002 may include a host of services that are made available to users of the cloud infrastructure system on demand. In addition to services related to providing code and/or data for performing controlled availability of objects in the visual design tool, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 2002 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 2002 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 2002 may be adapted to automatically provision, manage and track a customer's subscription to services offered by cloud infrastructure system 2002. Cloud infrastructure system 2002 may provide the cloud services via different deployment models. For example, services may be provided under a public cloud model in which cloud infrastructure system 2002 is owned by an organization selling cloud services (e.g., owned by Oracle Corporation) and the services are made available to the general public or different industry enterprises. As another example, services may be provided under a private cloud model in which cloud infrastructure system 2002 is operated solely for a single organization and may provide services for one or more entities within the organization. The cloud services may also be provided under a community cloud model in which cloud infrastructure system 2002 and the services provided by cloud infrastructure system 2002 are shared by several organizations in a related community. The cloud services may also be provided under a hybrid cloud model, which is a combination of two or more different models.

In some embodiments, the services provided by cloud infrastructure system 2002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2002. Cloud infrastructure system 2002 then performs processing to provide the services in the customer's subscription order.

In some embodiments, the services provided by cloud infrastructure system 2002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 2002 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 2002 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2002 may also include infrastructure resources 2030 for providing the resources used to provide various services to customers of the cloud infrastructure system. In one embodiment, infrastructure resources 2030 may include pre-integrated and optimized combinations of hardware, such as servers, storage, and networking resources to execute the services provided by the PaaS platform and the SaaS platform, and other resources.

In some embodiments, resources in cloud infrastructure system 2002 may be shared by multiple users and dynamically re-allocated per demand. Additionally, resources may be allocated to users in different time zones. For example, cloud infrastructure system 2002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2032 may be provided that are shared by different components or modules of cloud infrastructure system 2002 to enable provisioning of services by cloud infrastructure system 2002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2002 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2002, and the like.

In one embodiment, as depicted in FIG. 20, cloud management functionality may be provided by one or more modules, such as an order management module 2020, an order orchestration module 2022, an order provisioning module 2024, an order management and monitoring module 2026, and an identity management module 2028. These modules may include or be provided using one or more computers and/or servers, which may be general purpose computers, specialized server computers, server farms, server clusters, or any other appropriate arrangement and/or combination.

In an exemplary operation, at 2034, a customer using a client device, such as client device 2004, 2006 or 2008, may interact with cloud infrastructure system 2002 by requesting one or more services provided by cloud infrastructure system 2002 and placing an order for a subscription for one or more services offered by cloud infrastructure system 2002. In certain embodiments, the customer may access a cloud User Interface (UI) such as cloud UI 2012, cloud UI 2014 and/or cloud UI 2016 and place a subscription order via these UIs. The order information received by cloud infrastructure system 2002 in response to the customer placing an order may include information identifying the customer and one or more services offered by the cloud infrastructure system 2002 that the customer intends to subscribe to.

At 2036, the order information received from the customer may be stored in an order database 2018. If this is a new order, a new record may be created for the order. In one embodiment, order database 2018 can be one of several databases operated by cloud infrastructure system 2018 and operated in conjunction with other system elements.

At 2038, the order information may be forwarded to an order management module 2020 that may be configured to perform billing and accounting functions related to the order, such as verifying the order, and upon verification, booking the order.

At 2040, information regarding the order may be communicated to an order orchestration module 2022 that is configured to orchestrate the provisioning of services and resources for the order placed by the customer. In some instances, order orchestration module 2022 may use the services of order provisioning module 2024 for the provisioning. In certain embodiments, order orchestration module 2022 enables the management of business processes associated with each order and applies business logic to determine whether an order should proceed to provisioning.

As shown in the embodiment depicted in FIG. 20, at 2042, upon receiving an order for a new subscription, order orchestration module 2022 sends a request to order provisioning module 2024 to allocate resources and configure resources needed to fulfill the subscription order. Order provisioning module 2024 enables the allocation of resources for the services ordered by the customer. Order provisioning module 2024 provides a level of abstraction between the cloud services provided by cloud infrastructure system 2000 and the physical implementation layer that is used to provision the resources for providing the requested services. This enables order orchestration module 2022 to be isolated from implementation details, such as whether or not services and resources are actually provisioned on the fly or pre-provisioned and allocated/assigned upon request.

At 2044, once the services and resources are provisioned, a notification may be sent to the subscribing customers indicating that the requested service is now ready for use. In some instance, information (e.g. a link) may be sent to the customer that enables the customer to start using the requested services.

At 2046, a customer's subscription order may be managed and tracked by an order management and monitoring module 2026. In some instances, order management and monitoring module 2026 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 2000 may include an identity management module 2028 that is configured to provide identity services, such as access management and authorization services in cloud infrastructure system 900. In some embodiments, identity management module 2028 may control information about customers who wish to utilize the services provided by cloud infrastructure system 2002. Such information can include information that authenticates the identities of such customers and information that describes which actions those customers are authorized to perform relative to various system resources (e.g., files, directories, applications, communication ports, memory segments, etc.) Identity management module 2028 may also include the management of descriptive information about each customer and about how and by whom that descriptive information can be accessed and modified.

FIG. 21 illustrates an exemplary computer system 2100 that may be used to implement certain components according to some example embodiments. In some embodiments, computer system 1900 may be used to implement any of the various servers and computer systems described above. As shown in FIG. 21, computer system 2100 includes various subsystems including a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 may include tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2104 controls the operation of computer system 2100 and may comprise one or more processing units 2132, 2134, etc. A processing unit may include be one or more processors, including single core or multicore processors, one or more cores of processors, or combinations thereof. In some embodiments, processing subsystem 2104 can include one or more special purpose co-processors such as graphics processors (GPUs), digital signal processors (DSPs), or the like. In some embodiments, some or all of the processing units of processing subsystem 2104 can be implemented using customized circuits, such as application specific integrated circuits (ASICs), or field programmable gate arrays (FPGAs).

In some embodiments, the processing units in processing subsystem 2104 can execute instructions stored in system memory 2110 or on computer readable storage media 2122. In various embodiments, the processing units can execute a variety of programs or code instructions and can maintain multiple concurrently executing programs or processes. At any given time, some or all of the program code to be executed can be resident in system memory 2110 and/or on computer-readable storage media 2122 including potentially on one or more storage devices. Through suitable programming, processing subsystem 2104 can provide various functionalities described above for performing efficient application configuration patching operations.

In certain embodiments, a processing acceleration unit 2106 may be provided for performing customized processing or for off-loading some of the processing performed by processing subsystem 2104 so as to accelerate the overall processing performed by computer system 2100.

I/O subsystem 2108 may include devices and mechanisms for inputting information to computer system 2100 and/or for outputting information from or via computer system 2100. In general, use of the term "input device" is intended to include all possible types of devices and mechanisms for inputting information to computer system 2100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2118 provides a repository or data store for storing information that is used by computer system 2100. Storage subsystem 2118 provides a tangible non-transitory computer-readable storage medium for storing the basic programming and data constructs that provide the functionality of some embodiments. Software (programs, code modules, instructions) that when executed by processing subsystem 2104 provide the functionality described above may be stored in storage subsystem 2118. The software may be executed by one or more processing units of processing subsystem 2104. Storage subsystem 2118 may also provide a repository for storing data used in accordance with the some example embodiments.

Storage subsystem 2118 may include one or more non-transitory memory devices, including volatile and non-volatile memory devices. As shown in FIG. 21, storage subsystem 2118 includes a system memory 2110 and a computer-readable storage media 2122. System memory 2110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2100, such as during start-up, may typically be stored in the ROM. The RAM typically contains data and/or program modules that are presently being operated and executed by processing subsystem 2104. In some implementations, system memory 2110 may include multiple different types of memory, such as static random access memory (SRAM) or dynamic random access memory (DRAM).

By way of example, and not limitation, as depicted in FIG. 21, system memory 2110 may store application programs 2112, which may include client applications, Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 2122 may store programming and data constructs that provide the functionality of some embodiments. Software (programs, code modules, instructions) that when executed by processing subsystem 2104 a processor provide the functionality described above may be stored in storage subsystem 2118. By way of example, computer-readable storage media 2122 may include non-volatile memory such as a hard disk drive, a magnetic disk drive, an optical disk drive such as a CD ROM, DVD, a Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2122 may provide storage of computer-readable instructions, data structures, program modules, and other data for computer system 2100.

In certain embodiments, storage subsystem 2100 may also include a computer-readable storage media reader 2120 that can further be connected to computer-readable storage media 2122. Together and, optionally, in combination with system memory 2110, computer-readable storage media 2122 may comprehensively represent remote, local, fixed, and/or removable storage devices plus storage media for storing computer-readable information.

In certain embodiments, computer system 2100 may provide support for executing one or more virtual machines. Computer system 2100 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2100. Accordingly, multiple operating systems may potentially be run concurrently by computer system 2100. Each virtual machine generally runs independently of the other virtual machines.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to establish a communication channel to one or more client devices via the Internet for receiving and sending information from and to the client devices.

Communication subsystem 2124 may support both wired and/or wireless communication protocols. For example, in certain embodiments, communications subsystem 2124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

Communication subsystem 2124 can receive and transmit data in various forms. For example, in some embodiments, communications subsystem 2124 may receive input communication in the form of structured and/or unstructured data feeds 2126, event streams 2128, event updates 2130, and the like. For example, communications subsystem 2124 may be configured to receive (or send) data feeds 2126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2124 may be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2124 may also be configured to output the structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2100 depicted in FIG. 21 is intended only as a specific example. Many other configurations having more or fewer components than the system depicted in FIG. 21 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

What is claimed is:

1. A method, comprising:
   receiving, at a computer system via a visual development tool interface, selection of a first node of a plurality of nodes to configure in an integration flow;

identifying, by the computer system, a structure of the integration flow;
generating, by the computer system, based on the structure of the integration flow and a location of the first node in the integration flow, a list comprising an identifier for each other node of the plurality of nodes that are in the integration flow;
for each other node in the list:
querying, by the computer system, the node for node configuration data, and
adding, by the computer system, the node configuration data to a structure configuration data;
generating, by the computer system, available configuration options for the first node based on the structure configuration data; and
updating, by the computer system, the visual development tool interface with the available configuration options for the first node.

2. The method of claim 1, wherein updating the visual development tool interface with the available configuration options for the first node comprises displaying, in the visual development tool interface, a selectable list of available options for the first node.

3. The method of claim 2, wherein the displaying the selectable list of available options comprises displaying, in the visual development tool interface, a selectable list of available input options.

4. The method of claim 3, wherein the generating the list further comprises identifying a set of nodes based on the structure of the integration flow and the location of the first node in the integration flow, each node in the set of nodes preceding the location of the first node in the integration flow;
wherein querying the node for node configuration data comprises, for each node in the set of nodes, querying the node for data introduced into the integration flow by the node; and
wherein the selectable list of available input options is generated based on the data introduced into the integration flow by nodes preceding the first node in the integration flow.

5. The method of claim 2, wherein the displaying a selectable list of available options comprises displaying, in the visual development tool interface, a selectable list of available output options.

6. The method of claim 5, wherein the generating the list further comprises identifying a set of nodes based on the structure of the integration flow and the location of the first node in the integration flow, each node in the set of nodes following the location of the first node in the integration flow; and
wherein the selectable list of available output options is generated based on the set of nodes following the first node in the integration flow.

7. The method of claim 1, further comprising:
receiving, by the computer system, the location of the first node as an insertion point for the first node; and
adding, by the computer system, the first node to the integration flow at the insertion point.

8. A system, comprising:
a processor; and
a memory having stored thereon instructions that, when executed by the processor, cause the processor to:
receive, via a visual development tool interface, selection of a first node of a plurality of nodes to configure in an integration flow;
identify a structure of the integration flow;
generate, based on the structure of the integration flow and a location of the first node in the integration flow, a list comprising an identifier for each other node of the plurality of nodes that are in the integration flow;
for each other node in the list:
query the node for node configuration data, and
add the node configuration data to a structure configuration data;
generate available configuration options for the first node based on the structure configuration data; and
update the visual development tool interface with the available configuration options for the first node.

9. The system of claim 8, wherein the instructions that cause the processor to update the visual development tool interface with the available configuration options for the first node comprise further instructions that, when executed by the processor, cause the processor to display, in the visual development tool interface, a selectable list of available options for the first node.

10. The system of claim 9, wherein the instructions that cause the processor to display the selectable list of available options comprise further instructions that, when executed by the processor, cause the processor to display, in the visual development tool interface, a selectable list of available input options.

11. The system of claim 10, wherein the instructions that cause the processor to generate the list comprise further instructions that, when executed by the processor, cause the processor to identify a set of nodes based on the structure of the integration flow and the location of the first node in the integration flow, each node in the set of nodes preceding the first node in the integration flow;
wherein the instructions that cause the processor to query the node for node configuration data comprise further instructions that, when executed by the processor, cause the processor to, for each node in the set of nodes, query the node for data introduced into the integration flow by the node; and
wherein the selectable list of available input options is generated based on the data introduced into the integration flow by nodes preceding the first node in the integration flow.

12. The system of claim 9, wherein the instructions that cause the processor to display a selectable list of available options comprise further instructions that, when executed by the processor, cause the processor to display, in the visual development tool interface, a selectable list of available output options.

13. The system of claim 12, wherein the instructions that cause the processor to generate the list comprise further instructions that, when executed by the processor, cause the processor to identify a set of nodes based on the structure of the integration flow and the location of the first node in the integration flow, each node in the set of nodes following the location of the first node in the integration flow; and
wherein the selectable list of available output options is generated based on the set of nodes following the first node in the integration flow.

14. The system of claim 8, wherein the memory has stored thereon further instructions that, when executed by the processor, cause the processor to:
receive the location of the first node as an insertion point for the first node; and
add the first node to the integration flow at the insertion point.

15. A non-transitory, computer-readable storage device having stored thereon instructions that, when executed by a processor, cause the processor to:
- receive, via a visual development tool interface, selection of a first node of a plurality of nodes to configure in an integration flow;
- identify a structure of the integration flow;
- generate, based on the structure of the integration flow and a location of the first node in the integration flow, a list comprising an identifier for each other node of the plurality of nodes that are in the structure of the integration flow;
- for each other node in the list:
    - query the node for node configuration data, and
    - add the node configuration data to a structure configuration data;
- generate available configuration options for the first node based on the structure configuration data; and
- update the visual development tool interface with the available configuration options for the first node.

16. The non-transitory, computer-readable storage device of claim 15, wherein the instructions that cause the processor to update the visual development tool interface with the available configuration options for the first node comprise further instructions that, when executed by the processor, cause the processor to display, in the visual development tool interface, a selectable list of available options for the first node.

17. The non-transitory, computer-readable storage device of claim 16, wherein the instructions that cause the processor to display the selectable list of available options comprise further instructions that, when executed by the processor, cause the processor to display, in the visual development tool interface, a selectable list of available input options.

18. The non-transitory, computer-readable storage device of claim 17, wherein the instructions that cause the processor to generate the list further comprise further instructions that, when executed by the processor, cause the processor to identify a set of nodes based on the structure of the integration flow and the location of the first node in the integration flow, each node in the set of nodes preceding the location of the first node in the integration flow;
- wherein the instructions that cause the processor to query the node for node configuration data comprise further instructions that, when executed by the processor, cause the processor to, for each node in the set of nodes, query the node for data introduced into the integration flow by the node; and
- wherein the selectable list of available input options is generated based on the data introduced into the integration flow by nodes preceding the location of the first node in the integration flow.

19. The non-transitory, computer-readable storage device of claim 16, wherein the instructions that cause the processor to display a selectable list of available options comprise further instructions that, when executed by the processor, cause the processor to display, in the visual development tool interface, a selectable list of available output options.

20. The non-transitory, computer-readable storage device of claim 19, wherein the instructions that cause the processor to generate the list further comprise further instructions that, when executed by the processor, cause the processor to identify a set of nodes based on the structure of the integration flow and the location of the first node in the integration flow, each node in the set of nodes following the location of the first node in the integration flow; and
- wherein the selectable list of available output options is generated based on the set of nodes following the location of the first node in the integration flow.

* * * * *

UNITED STATES PATENT AND TRADEMARK OFFICE
CERTIFICATE OF CORRECTION

PATENT NO. : 10,216,491 B2
APPLICATION NO. : 15/706269
DATED : February 26, 2019
INVENTOR(S) : Gravenites et al.

Page 1 of 1

It is certified that error appears in the above-identified patent and that said Letters Patent is hereby corrected as shown below:

In the Specification

In Column 9, Line 15, delete "by" and insert -- be --, therefor.

Signed and Sealed this
Fourth Day of February, 2020

Andrei Iancu
*Director of the United States Patent and Trademark Office*